US012771694B2

(12) United States Patent
O'Neill et al.

(10) Patent No.: US 12,771,694 B2
(45) **Date of Patent: *Oct. 20, 2026**

(54) USE OF SENTIMENT ANALYSIS TO ASSESS TRUST IN A NETWORK

(71) Applicant: Juniper Networks, Inc., Sunnyvale, CA (US)

(72) Inventors: Charles Damian O'Neill, Ballymena (GB); Simon James, Newtownards (GB); Kieran Gerald McPeake, Belfast (GB); Hayden Paul Shorter, Bangor (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/922,748

(22) Filed: Oct. 22, 2024

(65) Prior Publication Data

US 2025/0047680 A1 Feb. 6, 2025

Related U.S. Application Data

(63) Continuation of application No. 17/644,555, filed on Dec. 15, 2021, now Pat. No. 12,170,670.

(51) Int. Cl.
*G06F 7/04* (2006.01)
*G06N 20/00* (2019.01)
(Continued)

(52) U.S. Cl.
CPC ........... *H04L 63/102* (2013.01); *G06N 20/00* (2019.01); *H04L 41/16* (2013.01);
(Continued)

(58) Field of Classification Search
CPC ............... H04L 63/102; H04L 63/1408; H04L 63/1425; H04L 63/20
See application file for complete search history.

(56) References Cited

U.S. PATENT DOCUMENTS 7,558,884 B2 7/2009 Fuller et al.
7,788,700 B1 8/2010 Feezel et al.
(Continued)

FOREIGN PATENT DOCUMENTS

CN 1716177 A 1/2006
CN 101507229 A 8/2009
(Continued)

OTHER PUBLICATIONS

Shelke et al, Review on Aspect Based Sentiment Analysis on Social Data, Mar. 19, 2021, IEEE, pp. 331-336. (Year: 2021).*
(Continued)

*Primary Examiner* — Philip J Chea
*Assistant Examiner* — Jenise E Jackson
(74) *Attorney, Agent, or Firm* — Hewlett Packard Enterprise Patent Department

(57) ABSTRACT

This disclosure describes techniques that include assessing trust in a system, and in particular, assessing trust by performing a sentiment analysis for an entity or device within a system. In one example, this disclosure describes a method that includes performing, by a computing system and based on information collected about a network entity in a computer network, a sentiment analysis associated with the network entity; determining, by the computing system and based on the sentiment analysis, a trust score for the network entity; and modifying, by the computing system and based on the trust score for the network entity, network operations within the computer network.

18 Claims, 8 Drawing Sheets

(51) Int. Cl.
*H04L 9/40* (2022.01)
*H04L 41/16* (2022.01)

(52) U.S. Cl.
CPC ...... *H04L 63/1408* (2013.01); *H04L 63/1425* (2013.01); *H04L 63/20* (2013.01)

(56) References Cited

U.S. PATENT DOCUMENTS

| | | | |
|---|---|---|---|
| 7,895,068 | B2 | 2/2011 | Lasalle et al. |
| 8,549,622 | B2 | 10/2013 | Byrne et al. |
| 8,595,282 | B2 | 11/2013 | Nachenberg |
| 9,363,283 | B1 | 6/2016 | Herrera-Yage et al. |
| 9,679,254 | B1 | 6/2017 | Mawji et al. |
| 9,769,174 | B2 | 9/2017 | Rieke et al. |
| 9,860,275 | B2 | 1/2018 | Kleinpeter et al. |
| 9,942,259 | B2 | 4/2018 | Madhu et al. |
| 10,055,466 | B2 | 8/2018 | Trudel et al. |
| 10,068,095 | B1 | 9/2018 | Segal et al. |
| 10,237,293 | B2 | 3/2019 | Hajmasan et al. |
| 10,432,605 | B1 | 10/2019 | Lester et al. |
| 10,491,594 | B2 | 11/2019 | Yan |
| 10,511,510 | B2 | 12/2019 | Ricci |
| 10,673,880 | B1 | 6/2020 | Pratt et al. |
| 10,855,619 | B1 | 12/2020 | Andrews et al. |
| 10,855,725 | B2 | 12/2020 | Pai et al. |
| 10,924,377 | B2 | 2/2021 | Chauhan |
| 10,958,673 | B1 | 3/2021 | Chen et al. |
| 11,038,766 | B2 | 6/2021 | Shen et al. |
| 11,386,129 | B2 | 7/2022 | Chrapko et al. |
| 11,503,061 | B1 | 11/2022 | Lin et al. |
| 11,640,569 | B2 | 5/2023 | Chrapko |
| 11,683,331 | B2 | 6/2023 | Grammel et al. |
| 12,170,670 | B2 | 12/2024 | O'Neill et al. |
| 2005/0132229 | A1 | 6/2005 | Zhang et al. |
| 2005/0262302 | A1 | 11/2005 | Fuller et al. |
| 2006/0248573 | A1 | 11/2006 | Pannu et al. |
| 2007/0107059 | A1 | 5/2007 | Chasin et al. |
| 2007/0147594 | A1 | 6/2007 | Aaron et al. |
| 2009/0100504 | A1 | 4/2009 | Conner et al. |
| 2009/0165116 | A1 | 6/2009 | Morris |
| 2009/0172776 | A1 | 7/2009 | Makagon et al. |
| 2010/0220613 | A1 | 9/2010 | Hendriks et al. |
| 2011/0072508 | A1 | 3/2011 | Agarwal et al. |
| 2011/0280160 | A1 | 11/2011 | Yang |
| 2013/0097317 | A1 | 4/2013 | Sheleheda et al. |
| 2013/0138290 | A1 | 5/2013 | Falkenstein |
| 2013/0249928 | A1 | 9/2013 | Buhr et al. |
| 2013/0298192 | A1 | 11/2013 | Kumar et al. |
| 2013/0298242 | A1 | 11/2013 | Kumar et al. |
| 2013/0298244 | A1 | 11/2013 | Kumar et al. |
| 2014/0164342 | A1* | 6/2014 | Liapis ................ G06F 16/9538 707/706 |
| 2014/0325586 | A1 | 10/2014 | Halliday et al. |
| 2015/0074390 | A1 | 3/2015 | Stoback et al. |
| 2015/0156208 | A1 | 6/2015 | Kirkham et al. |
| 2015/0180903 | A1 | 6/2015 | Cooper et al. |
| 2015/0304327 | A1 | 10/2015 | Burstein et al. |
| 2015/0312267 | A1 | 10/2015 | Thomas |
| 2016/0191540 | A1 | 6/2016 | Fuka et al. |
| 2016/0261613 | A1 | 9/2016 | Farmer et al. |
| 2016/0277424 | A1 | 9/2016 | Mawji et al. |
| 2016/0292288 | A1* | 10/2016 | Walton ................. G06F 16/335 |
| 2016/0373486 | A1 | 12/2016 | Kraemer |
| 2016/0381079 | A1 | 12/2016 | Ben-Shalom et al. |
| 2017/0140305 | A1 | 5/2017 | Moss |
| 2017/0171231 | A1 | 6/2017 | Reybok et al. |
| 2017/0214694 | A1 | 7/2017 | Yan |
| 2017/0353496 | A1 | 12/2017 | Pai et al. |
| 2018/0075563 | A1 | 3/2018 | Ananthanpillai et al. |
| 2018/0091453 | A1 | 3/2018 | Jakobsson |
| 2018/0124078 | A1 | 5/2018 | Hajmasan et al. |
| 2018/0139116 | A1 | 5/2018 | Ricci |
| 2018/0183827 | A1 | 6/2018 | Zorlular et al. |
| 2018/0219865 | A1 | 8/2018 | Das |
| 2019/0182286 | A1 | 6/2019 | Zini |
| 2019/0182287 | A1 | 6/2019 | Hanley et al. |
| 2019/0199759 | A1 | 6/2019 | Anderson et al. |
| 2019/0207954 | A1 | 7/2019 | Ahuja et al. |
| 2019/0268366 | A1 | 8/2019 | Zeng et al. |
| 2019/0310929 | A1 | 10/2019 | Wright et al. |
| 2019/0342323 | A1 | 11/2019 | Henderson et al. |
| 2020/0012796 | A1 | 1/2020 | Trepagnier et al. |
| 2020/0067935 | A1 | 2/2020 | Carnes et al. |
| 2020/0279183 | A1 | 9/2020 | Chrapko |
| 2020/0301969 | A1 | 9/2020 | Chrapko et al. |
| 2020/0302540 | A1* | 9/2020 | Xiu ......................... G06F 40/30 |
| 2020/0356676 | A1 | 11/2020 | Gorlamandala |
| 2020/0396241 | A1 | 12/2020 | Crabtree et al. |
| 2021/0029152 | A1 | 1/2021 | Charles et al. |
| 2021/0075794 | A1 | 3/2021 | Gazit et al. |
| 2021/0273968 | A1 | 9/2021 | Shaieb et al. |
| 2021/0409405 | A1* | 12/2021 | Salajegheh ......... H04L 63/0807 |
| 2022/0043913 | A1 | 2/2022 | Keith, Jr. |
| 2022/0103588 | A1 | 3/2022 | Shaw |
| 2022/0103592 | A1 | 3/2022 | Semel et al. |
| 2022/0166788 | A1 | 5/2022 | Grammel et al. |
| 2022/0168653 | A1 | 6/2022 | Weising et al. |
| 2022/0201042 | A1 | 6/2022 | Crabtree et al. |
| 2022/0210142 | A1 | 6/2022 | Sohail et al. |
| 2022/0329630 | A1 | 10/2022 | Li |
| 2022/0345394 | A1* | 10/2022 | Vasseur ................... H04L 45/14 |
| 2023/0083952 | A1 | 3/2023 | O'Neill et al. |
| 2023/0128998 | A1 | 4/2023 | Ping et al. |
| 2023/0185943 | A1 | 6/2023 | Zhang et al. |
| 2023/0188527 | A1 | 6/2023 | O'Neill et al. |
| 2023/0300150 | A1 | 9/2023 | O'Neill et al. |
| 2024/0223589 | A1 | 7/2024 | Grammel et al. |

FOREIGN PATENT DOCUMENTS

| | | | |
|---|---|---|---|
| CN | 102171657 | A | 8/2011 |
| CN | 105378790 | A | 3/2016 |
| CN | 106575323 | A | 4/2017 |
| CN | 108075925 | A | 5/2018 |
| CN | 109196505 | A | 1/2019 |
| CN | 109564669 | A | 4/2019 |
| CN | 109891422 | A | 6/2019 |
| CN | 109948911 | A | 6/2019 |
| CN | 110249588 | A | 9/2019 |
| CN | 110313009 | A | 10/2019 |
| EP | 1832059 | A1 | 9/2007 |
| EP | 3343864 | A1 | 7/2018 |
| EP | 4002795 | A1 | 5/2022 |
| WO | 2006/070172 | A1 | 7/2006 |
| WO | 2006/094275 | A2 | 9/2006 |

OTHER PUBLICATIONS

Das et al, Algorithm for Prediction of Negative Links Using Sentiment Analysis in Social Networks, Jun. 30, 2017, IEEE, pp. 1570-1575. (Year: 2017).*

Response to Communication pursuant to Article 94(3) EPC dated May 27, 2025, from counterpart European Application No. 22181648.1 filed Sep. 25, 2025, 10 pp.

Response to Office Action dated May 12, 2025, from counterpart Chinese Application No. 202210760004.4 filed Sep. 10, 2025, 10 pp.

Office Action from U.S. Appl. No. 17/655,140 dated Dec. 2, 2025, 7 pp.

Osborn et al., "BeyondCorp—Design to Deployment at Google", vol. 41, No. 1, Mar. 1, 2016, pp. 28-35, URL: https://www.usenix.org/system/files/login/articles/login_spring16_06_osborn.pdf.

Second Office Action from counterpart Chinese Application No. 202210760004.4 dated Oct. 29, 2025, 8 pp.

Prosecution History from U.S. Appl. No. 17/644,555, dated Nov. 22, 2023 through Nov. 15, 2024, 53 pp.

Prosecution History from U.S. Appl. No. 17/655,140, dated May 20, 2024 through Feb. 3, 2025, 65 pp.

Communication pursuant to Article 94(3) EPC from counterpart European Application No. 22181648.1 dated May 27, 2025, 7 pp.

(56) References Cited

OTHER PUBLICATIONS

First Office Action and Search Report from counterpart Chinese Application No. 202210760004.4 dated May 12, 2025, 15 pp. Translation Attached.
"Cybersecurity of 5G networks EU Toolbox of risk mitigating measures," NIS Cooperation Group, CG Publication, Jan. 2020, 45 pp.
"Time Guidance for Network Operators, Chief Information Officers, and Chief Information Security Officers," Cybersecurity and Infrastructure Security Agency, Jun. 2020, 18 pp.
"Overview of Risks Introduced By 5G Adoption in the United States," Critical Infrastructure Security and Resilience Note, Cybersecurity and Infrastructure Security Agency, Jul. 31, 2019, 16 pp.
CIS Benchmarks, "CIS Cisco IOS 15 Benchmark", National Institute of Standards and Technology, vol. 4, No. 1, Apr. 11, 2022, 214 pp., URL: https://ncp.nist.gov/checklist/599.
Conran, "Zero Trust Networking (ZTN): don't trust anything," The Network Architect, Sep. 18, 2018, 7 pp.
Extended European Search Report and Search Opinion received for European Application No. 22181648.1, mailed on Dec. 12, 2022, 9 pages.
Jian et al., "Dynamic Evaluation Method of Network Trust based on Congnitive Behavior," Communications Technology, vol. 49, No. 9, Sep. 2016, 6 pp.
Lu et al., "Trust Evaluation in Networked Manufacturing Environment," Journal of WUT, vol. 35 No. 2, Apr. 2013, 4 pp.
Mandaglio et al., Generalized Preference Learning for Trust Network Inference, IEEE, Dec. 2, 2019, pp. 174583-174596. (Year: 2019).
Office Action from U.S. Appl. No. 17/655,140 dated May 20, 2024, 21 pp.
Omeyer, "7 Top Metrics for Measuring Your Technical Debt", Jan. 13, 2022, 6 pp., URL: https://dev.to/alexomeyer/8-top-metrics-for-measuring-your-technical-debt-5bnm.
Response to Extended Search Report dated Dec. 12, 2022, from counterpart European Application No. 22181648.1 filed Dec. 21, 2023, 17 pp.
Response to Office Action dated May 20, 2024 from U.S. Appl. No. 17/655,140, filed Aug. 20, 2024, 7 pp.
U.S. Appl. No. 16/949,996, filed Nov. 23, 2020, naming inventors Grammel et al.
U.S. Appl. No. 17/474,871, filed Sep. 14, 2021, naming inventors O'Neill et al.
U.S. Appl. No. 17/655,140, filed Mar. 16, 2022, naming inventors O'Neill et al.
U.S. Appl. No. 18/148,762, filed Dec. 30, 2022, naming inventors Grammel et al.
U.S. Appl. No. 18/353,575, filed Jul. 17, 2023, by O'Neill et al.
Zhang et al., Mining Users Trust From E-commerce Reviews Based on Sentiment Similarity Analysis, IEEE, Jan. 31, 2019, pp. 13523-13535. (Year: 2019).

* cited by examiner

USE OF SENTIMENT ANALYSIS TO ASSESS TRUST IN A NETWORK

CROSS REFERENCE

This application is a continuation application of and claims priority to U.S. patent application Ser. No. 17/644,555 filed on Dec. 15, 2021, which is hereby incorporated by reference herein in its entirety.

TECHNICAL FIELD

The disclosure relates to computer networks, and, to trust levels attributed to devices in a network.

BACKGROUND

Devices or network entities in a network are typically relied upon to perform various operations on behalf of users of the network. Some network entities are more reliable than others. Some network entities are more secure than others. Zero-trust networking is an approach to network security in which network administrators assume that network entities should not be trusted by default, even if those network entities are in a private network or previously verified. Example types of network entities may include network nodes (e.g., endpoint devices, intermediate network devices, etc.), network services, or other types of real or virtual entities that can be identified on a computer network. Because network entities are not trusted by default in zero-trust networking, identity and integrity checks are routinely performed on network entities, even if such entities are part of a private computer network.

SUMMARY

This disclosure describes techniques that include assessing trust in a system, and in particular, assessing trust by performing a sentiment analysis for an entity or device within a system. As described herein, and in a networking context, a computing system may assess sentiment associated with an entity or device by analyzing information about the entity or device. Such information may include text or other information derived from diagnostic, input, messaging, or other systems. Such information may also include text or other information derived from metadata associated with the device. Based on information associated with the device, sentiment may be determined, and may be expressed in terms of a binary sentiment (e.g., positive, or negative), a category of sentiment (e.g., positive, neutral, or negative), a sentiment score (e.g., 1-100), or in another way. Techniques described herein may include discerning subjective (as opposed to factual) material and extracting various forms of attitudinal information, which may include sentiment, opinion, mood, emotion, and other information.

A trust score may be calculated based on sentiment. In some examples, a trust score is calculated using sentiment as a factor in the calculation. In other examples, a trust score is calculated, and the sentiment is used to adjust the trust score appropriately. In either case, sentiment analysis may be used to improve the accuracy of trust metrics. Accurately assessing trust metrics brings significant benefits, including increased customer confidence, better decision making, better network operation, and potentially improved customer relations.

A computing system may use trust scores in various ways, including by performing or enabling performance of various actions based on the trust scores of network devices or entities. For instance, in some examples, a computing system may use trust scores that are based on sentiment analysis to modify traffic patterns in a computer network, limit or enable access to devices in a network, or perform other operations.

Examples herein are often described in terms of entities that take the form of network devices, computing devices, and/or computing services (e.g., "network entities"). However, techniques described herein may apply to other types of entities. Such entities may be, for example, quantitative or qualitative entities.

In some examples, this disclosure describes operations performed by a network controller in accordance with one or more aspects of this disclosure. In one specific example, this disclosure describes a method comprising performing, by a computing system and based on information collected about a network entity in a computer network, a sentiment analysis associated with the network entity; determining, by the computing system and based on the sentiment analysis, a trust score for the network entity; and modifying, by the computing system and based on the trust score for the network entity, network operations within the computer network.

In another example, this disclosure describes a system comprising processing circuitry and a storage device, wherein the processing circuitry has access to the storage device and is configured to: perform, based on information collected about a network entity in a computer network, a sentiment analysis associated with the network entity; determine, based on the sentiment analysis, a trust score for the network entity; and modify, based on the trust score for the network entity, network operations within the computer network.

In another example, this disclosure describes a computer-readable storage medium comprising instructions that, when executed, configure processing circuitry of a computing system to perform, based on information collected about a network entity in a computer network, a sentiment analysis associated with the network entity; determine, based on the sentiment analysis, a trust score for the network entity; and modify, based on the trust score for the network entity, network operations within the computer network

DETAILED DESCRIPTION

Figure 1A:
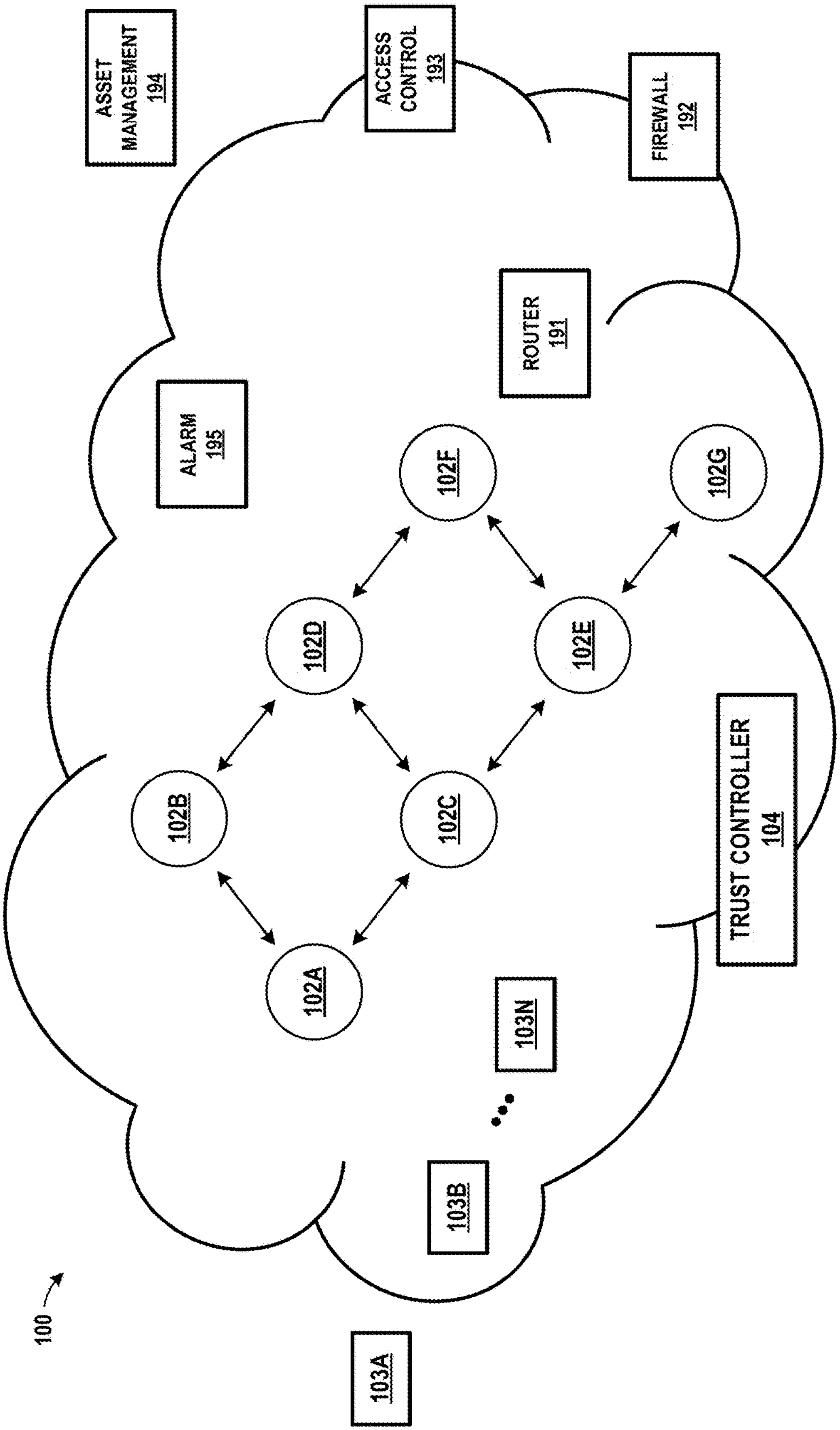
FIG. 1A is a conceptual diagram illustrating an example computer network in which trust scores are calculated, in accordance with one or more aspects of this disclosure.

FIG. 1A is a conceptual diagram illustrating an example computer network 100 in accordance with one or more aspects of this disclosure. Computer network 100 may itself include multiple computer networks, and such computer networks may include private networks (e.g., internal corporate or government networks), virtual private networks, residential networks, or public networks (e.g., cellular communication networks, Internet backbone networks, etc.).

In the example of FIG. 1A, computer network 100 includes a set of network entities 102A through 102G, where "G" may be any number. This disclosure may refer to network entities 102A through 102G collectively as "network entities 102." In general, each of network entities 102 is individually addressable within computer network 100 and can send and receive data on computer network 100. One or more of network entities 102 may be computing nodes, such as real or virtual endpoint devices (e.g., personal computers, smartphones, tablet computers, server devices, laptop computers, Internet of Things (IoT) devices, wearable devices, etc.) or real or virtual intermediate devices (e.g., routers, switches, firewall devices, virtualized appliances, etc.). In some examples, one or more of network entities 102 may be network services, such as web servers, certain application programming interfaces (APIs), media streaming services, and so on. Other types of network entities may include components, controllers, and routes through computer network 100.

In some examples, each of network entities 102 may have accompanying metadata, such as a device or port description (e.g., which may be configured on the device by an administrator). Such metadata may also include profile names, which may include descriptions of the device as labeled by an administrator or provided by a customer. Metadata associated with one or more of network entities 102 may include website or site names or descriptions of such entities, which may include geographic locations corresponding to where the entity is housed or located.

Also shown in FIG. 1A are input systems 103A through 103N (collectively "input systems 103"). Each of input systems 103 may correspond to or include one or more systems or devices often found on a network. Such systems may include devices that support diagnostic processes implemented within a network (e.g., "trouble ticketing" systems, customer feedback systems, and alarm applications), user devices, and systems to support email, messaging, chat, and/or collaboration applications (e.g., Microsoft Teams or Salesforce.com's Slack platform).

FIG. 1A also illustrates router 191, firewall 192, access control system 193, asset management system 194, and alarm system 195. Router 191 may represent any network device operating as a router on network 100. Firewall 192 may perform functions relating to monitoring incoming and outgoing network traffic for network 100. Access control system 193 may perform functions relating to regulating or limiting access to one or more network entities 102 within network 100 or limiting access to other resources provided by network 100. Asset management system 194 may perform functions relating to managing, administering, and/or accounting for resources within network 100 or even outside of network 100. Alarm system 195 may perform functions relating to detecting conditions for, generating, and/or managing alarms that may be triggered by conditions within network 100.

Although each of router 191, firewall 192, access control system 193, asset management system 194, and alarm system 195 are illustrated as being distinct from network entities 102, each such system may be implemented as one or more network entities 102 or implemented using one or more network entities 102. Also, for ease of illustration, one router 191, firewall 192, access control system 193, asset management system 194, and alarm system 195 is shown in FIG. 1A. Techniques described herein, however, may apply to environments in which any number of routers 191, firewalls 192, access control systems 193, asset management systems 194, and alarm systems 195 are deployed.

As mentioned above, computer networks such as computer network 100 may be designed to operate using a zero-trust networking architecture. The concept of trust arises in not just a security context, but other contexts as well, including contexts involving risk management associated with risks that an organization or business assumes when it relies on a network or devices within the network. However, in a security context, when a computer network operates using a zero-trust networking architecture, numerous authentication and security checks are performed (e.g., each time a service is requested from a network entity in the computer network). Similar processes and checks may be performed in other contexts as well. Performing such checks may be resource intensive and may increase network latency.

Accordingly, to increase network performance in computer networks that operate using trust architectures (for security purposes and otherwise), network administrators may reduce the intensity of checks with respect to specific network entities on an ad hoc basis. While doing so may increase network performance, doing so may undermine the overall security and/or reliability of the network to the extent that there is no systematic methodology for reducing the intensity of checks with respect to individual network entities. Rather, such reductions in the intensity of checks may be based on a network administrator's experience and intuition. This may lead to inconsistencies and misconfigurations in the computer network, e.g., because knowledge of the reductions in the intensity of checks might not be transferred between network administrators. Ultimately, this may lead to adverse outcomes, such as security breaches and network outages.

This disclosure describes techniques that may address one or more of these issues. For instance, as shown in the example of FIG. 1A, computer network 100 includes a trust controller 104. Trust controller 104 is a computing system that comprises one or more computing devices, such as one or more server devices, personal computing devices, or other types of computing devices. In some examples described herein, trust controller 104 determines a level of trust for network entities 102 in computer network 100. In some examples, a level of trust may be expressed as a number or a trust "score." In other examples, a level of trust may be expressed as a category of trust values that indicate a granular continuum of trust values (e.g., "highly trusted," "trusted," "untrusted," "trust unverified"), or categories of trust values for certain operations ("trusted for data transfer," "trusted for testing,"). In still other examples, a level of trust may be expressed as a binary value (e.g., "trusted" or "untrusted").

Although some examples of this disclosure are described in the context of calculating a "trust score," such examples may alternatively be implemented using a "level of trust." Similarly, examples described in terms of a "level of trust" could also be implemented using a trust score. In that sense, therefore, the terms "trust score" and "level of trust" may, depending on the context, be used herein interchangeably.

Additionally, trust controller 104 may use the trust scores for network entities 102 to perform various actions with respect to computer network 100. In some examples, one or more computing systems other than trust controller 104 may determine trust scores and/or use the trust scores for network entities 102 to perform actions with respect to computer network 100. However, for ease of explanation, at least some examples herein describe trust controller 104 as calculating trust scores and performing actions. In such examples, because trust controller 104 determines the trust scores in a predictable, reproducible way, the trust scores may be applied consistently throughout network entities of computer network 100. Thus, inconsistencies associated with ad hoc adjustments to authentication, security, and/or other checking may be reduced and there may be less need for documentation to pass knowledge of security procedures between network administrators. Trust controller 104 may be implemented as a single trust controller or as (or within) a system (e.g., a hierarchy) of two or more trust controllers. In examples where trust controller 104 is implemented as a system of trust controllers, the trust controllers of trust controller 104 may correspond to specific classes of network entities, different network entities in sub-networks of computer network 100, or other groupings of network entities Trust controller 104 may determine trust scores for network entities 102. The trust score for a network entity indicates a level of trust in the network entity. In general, there is greater trust in a network entity if the network entity has previously performed in a manner that is desired by administrators of computer network 100. Conversely, there is less trust in a network entity if the network entity has not performed in a manner that is desired by administrators of computer network 100. For example, the trust score for a network entity may indicate low trust if the network entity is known to be compromised by malware, if the network entity is known to generate corrupted data, if the network entity is known to have frequent service outages, if the network entity has known unpatched security flaws, and so on.

Contribution classes are classes of information that contribute to the trust score for a network entity. In some examples, the contribution classes include one or more of a set of prerequisites for the network entity, a set of variable factors for the network entity, and/or a set of reputation factors for the network entity.

In some examples, there may be a separate sub-score for each of the contribution classes. For instance, there may be a first sub-score for the prerequisites for the network entity, a second sub-score for the variable factors for the network entity, and a third sub-score for the reputation factors for the network entity. In some examples, the sub-score for a contribution class is expressed as a percentage of a highest possible sub-score for the contribution class. In other examples, sub-scores for contribution classes are expressed in other ways. Trust controller 104 may use the sub-scores for the contribution classes (e.g., the first, second, and third sub-scores) for the network entity to determine the trust score for the network entity. Thus, the trust score for the network entity may be the result of a mathematic computation that is based on one or more of the prerequisites for the network entity, the variable factors for the network entity, and/or the reputation factors for the network entity.

Each of the prerequisites for the network entity is, in general, a condition that must be satisfied for the trust score for the network entity to have a value greater than a minimum value (e.g., zero). In this disclosure, a trust score for a network entity having the minimum value means that a lowest trust level (e.g., no trust) is afforded to the network entity. In some examples, the minimum value may be equal to zero. However, values other than zero may be used to represent a trust score indicating no trust.

The variable factors for a network entity correspond to current characteristics of the network entity. Example characteristics of a network entity may include a current configuration of the network entity, a version of the network entity, active features of the network entity, sentiment values or polarity associated with a network entity, and so on. The variable factors may be weighted such that some of the variable factors contribute more to the variable factors sub-score than other ones of the variable factors.

Each of the reputation factors for a network entity may be a function of specified historical events involving the network entity. For example, trust controller 104 modifies the values of reputational factors for a network entity based on behavior of the network entity over time. For example, trust controller 104 may modify the value of one reputation factor based on the number of times that the network entity spontaneously reboots. In another example, trust controller 104 may modify the value of a reputation factor based on the number of times the network entity has been reconfigured.

Trust controller 104 may determine a trust score for a network entity based on several factors. For instance, trust controller 104 may determine a trust score for a network entity based on one or more contribution classes and/or by inferring trust based on other known trust relationships in the network. Accordingly, trust controller 104 may calculate trust scores based on several factors. In some examples, such factors may include sentiment information derived from data collected by one or more of input system 103. Such sentiment information may be derived from text associated with one or more of input systems 103, which may include information derived from diagnostic data associated with one or more of network entities 102, such as notes generated by an administrator or comments provided by a user when addressing an issue arising with a network entity 102 in a trouble ticketing system implemented within network 100. In other examples, sentiment information may be derived from text or other information associated with metadata associated with one or more of network entities 102.

In calculating a trust score, trust controller 104 may also consider attributes of entities that separate one entity from another entity. For example, if network entity 102A trusts network entity 102C, and network entity 102C trusts network entity 102E, network entity 102A may trust network entity 102E to some extent, since network entity 102A trusts an entity that also trusts network entity 102E. In such an example, trust controller 104 may increase the trust score for network entity 102E for operations that network entity 102A may perform with network entity 102E (e.g., a transfer of data). Network entity 102A might not have any direct interactions with network entity 102E, but network entity 102A might be able to infer a trust relationship with network entity 102E, based on the trust network entity 102A has in intervening entities (e.g., network entity 102C).

On the other hand, if network entity 102A trusts network entity 102C, but network entity 102C does not trust network entity 102E, then network entity 102A might not trust network entity 102E, since network entity 102C (an entity that network entity 102A trusts) does not trust network entity 102E. In this example, trust controller 104 may decrease the trust score for network entity 102E for operations that network entity 102A may perform with network entity 102E. Network entity 102A may therefore determine a trust inference with respect to network entity 102E that is based on its level of trust with network entity 102C and network entity 102C's level of trust with network entity 102E.

Further details relating to trust scoring, particularly in the context of computer networks, are available in U.S. patent application Ser. No. 16/949,996, filed Nov. 23, 2020, entitled "Trust Scoring of Network Entities in Networks," the entire content of which is incorporated herein by reference. In addition, further details relating to inferring trust, particularly in the context of computer networks, are available in U.S. patent application Ser. No. 17/474,871, filed Sep. 14, 2021, entitled "Inferring Trust in Computer Networks," the entire content of which is incorporated herein by reference.

Figure 1B:
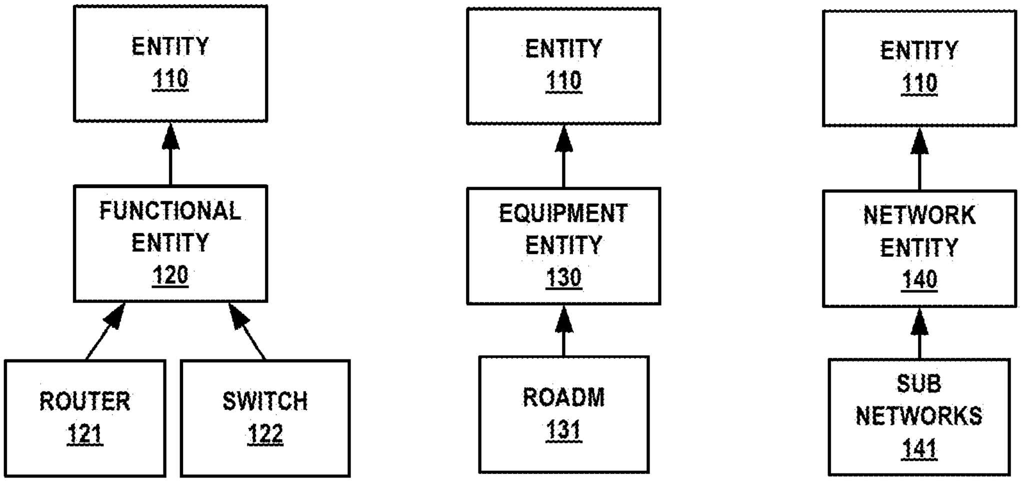
FIG. 1B, FIG. 1C, and FIG. 1D are conceptual diagrams illustrating various types of entity specializations, in accordance with one or more aspects of the present disclosure.
Figure 1C:
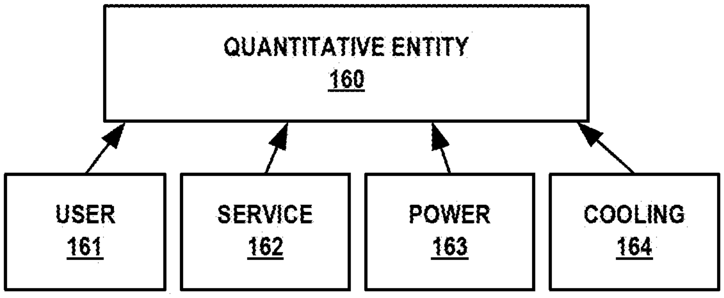
Figure 1D:
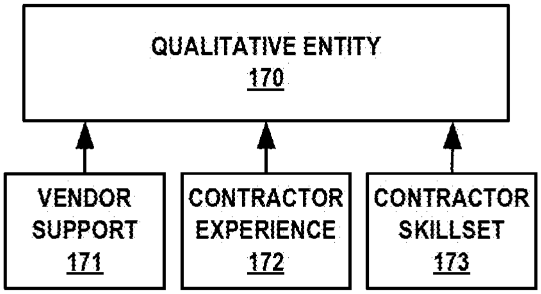

FIG. 1B, FIG. 1C, and FIG. 1D are conceptual diagrams illustrating various types of entity specializations, in accordance with one or more aspects of the present disclosure. For example, FIG. 1B illustrates that an entity can take the form of a functional entity, such as one or more routers 121 or one or more switches 122. As also illustrated in FIG. 1B, an entity could take the form of an equipment entity or a network entity, and represent an aggregation of equipment (e.g., a specific type of equipment, such as a set of reconfigurable optical add-drop multiplexers or "ROADMs") or networks (e.g., subnets or sub networks). The types of entities illustrated in FIG. 1B may generally correspond to the types of entities described in connection with FIG. 1A.

Although FIG. 1A is described in terms of entities that take the form of network entities 102 (e.g., network devices, computing devices, computing services, and the like), the term "entity" may, in other examples, encompass broader concepts. For example, FIG. 1C and FIG. 1D show other types of entities or at least different classifications of entities, such as quantitative entities 160 and qualitative entities 170. Quantitative entities 160 may include users 161, services 162, power attributes 163, cooling attributes 164. Qualitative entities 170 may include other types of entities, perhaps non-physical entities.

In the example of FIG. 1D, qualitative entities 170 include one or more instances of vendor support 171, contractor experiences 172, and/or contractor skillsets 173. Techniques described herein may apply to both quantitative entities 160 and qualitative entities 170 having a trust score. Such a trust score may be defined to some extent based on sentiment analysis, based on text or other data associated with information or other data associated with one or more instances of vendor support 171, data associated with contractor experiences 172, and/or data associated with or describing assessments of contractor skillsets 173. Such qualitative entities 170 may be particularly susceptible to a sentiment analysis, given that text describing such entities may be readily available through customer reviews or text-based communications among vendors, contractors, customers, and other personnel.

In addition, a component of a trust score in certain situations may be spatial in nature. For example, as described herein, a trust score may also be defined to some extent based on the level of trust among neighboring entities in a graph, diagram, table, or other arrangement of data.

Figure 2:
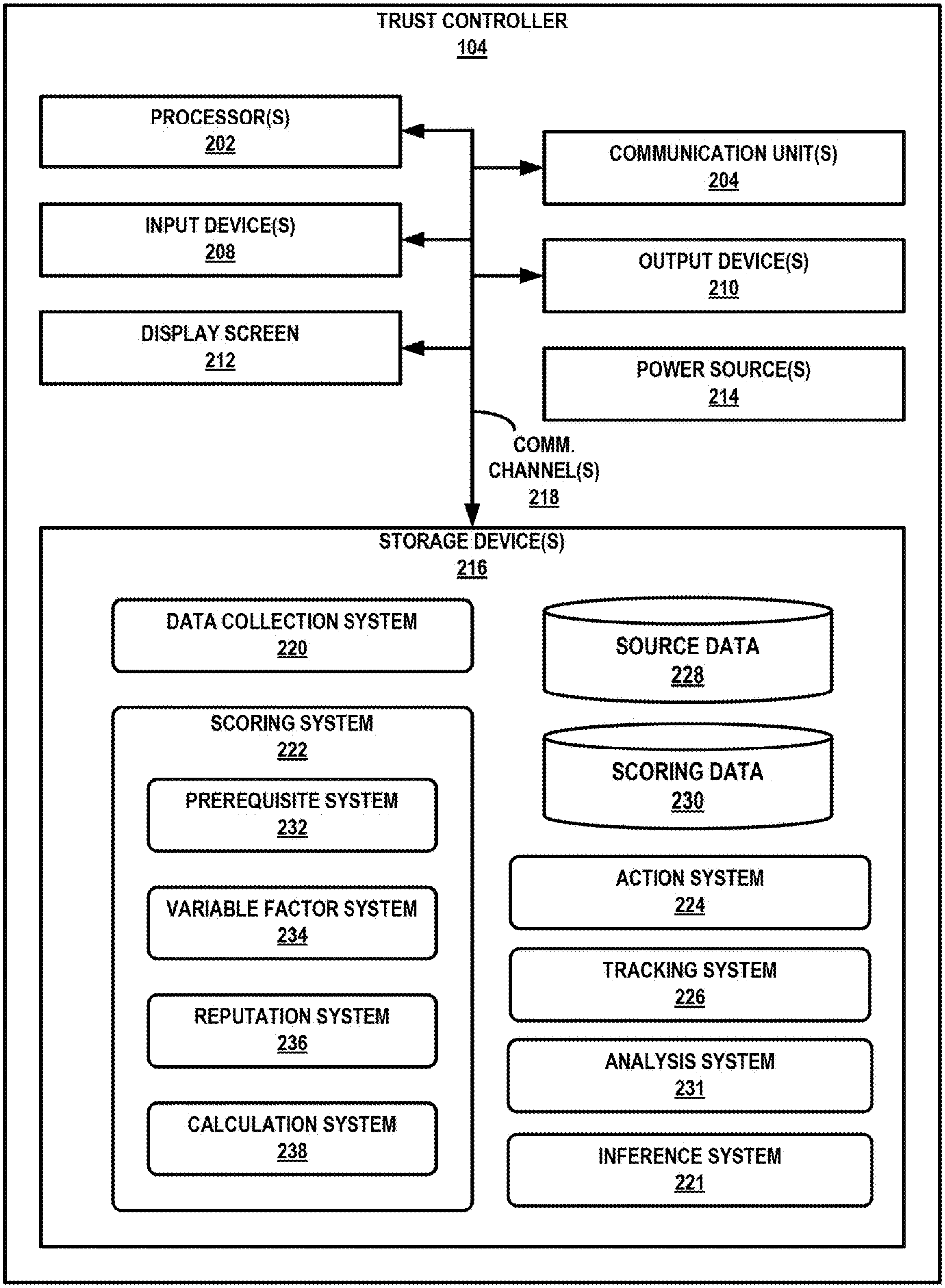
FIG. 2 is a block diagram illustrating example components of trust controller in accordance with one or more aspects of this disclosure.

FIG. 2 is a block diagram illustrating example components of trust controller 104 in accordance with one or more aspects of this disclosure. FIG. 2 illustrates one example of trust controller 104, and this disclosure encompasses any other appropriate configurations of trust controller 104.

As shown in the example of FIG. 2, trust controller 104 includes one or more processors 202, one or more communication units 204, one or more input devices 208, one or more output devices 210, zero or more display screens 212, one or more power sources 214, one or more storage devices 216, and one or more communication channels 218. Trust controller 104 may include other components. For example, trust controller 104 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source(s) 214 may provide electrical energy to components 202, 204, 208, 210, 212 and 216.

Storage device(s) 216 may store information required for use during operation of trust controller 104. In some examples, storage device(s) 216 have the primary purpose of being a short-term and not a long-term computer-readable storage medium. Storage device(s) 216 may include volatile memory and may therefore not retain stored contents if powered off. In some examples, storage device(s) 216 includes non-volatile memory that is configured for long-term storage of information and for retaining information after power on/off cycles. In some examples, processor(s) 202 of trust controller 104 may read and execute instructions stored by storage device(s) 216.

Trust controller 104 may include one or more input devices 208 that trust controller 104 uses to receive user input. Examples of user input include tactile, audio, and video user input. Input device(s) 208 may include presence-sensitive screens, touch-sensitive screens, mice, keyboards, voice responsive systems, microphones, motion sensors capable of detecting gestures, or other types of devices for detecting input from a human or machine.

Communication unit(s) 204 may enable trust controller 104 to send data to and receive data from one or more other computing devices (e.g., via a computer network, such as a local area network or the Internet). For instance, communication unit(s) 204 may be configured to receive data from network entities 102. In some examples, communication unit(s) 204 may include wireless transmitters and receivers that enable trust controller 104 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Additionally, trust controller 104 may use communication unit(s) 204 to communicate with one or more other devices.

Output device(s) 210 may generate output. Examples of output include tactile, audio, and video output. Output device(s) 210 may include presence-sensitive screens, sound cards, video graphics adapter cards, speakers, liquid crystal displays (LCD), light emitting diode (LED) displays, or other types of devices for generating output. Output device (s) 210 may include display screen 212. In some examples, output device(s) 210 may include virtual reality, augmented reality, or mixed reality display devices.

Processor(s) 202 may include processing circuitry configured to perform various actions. Processor(s) 202 may be configured to read instructions from storage device(s) 216 and may execute instructions stored by storage device(s) 216. Execution of the instructions by processor(s) 202 may configure or cause trust controller 104 to provide at least some of the functionality ascribed in this disclosure to trust controller 104 or components thereof (e.g., processor(s) 202). As shown in the example of FIG. 2, storage device(s) 216 include computer-readable instructions associated with a data collection system 220, a scoring system 222, an action system 224, and a tracking system 226. In the example of FIG. 2, storage device(s) 216 may also include source data 228 and scoring data 230. Furthermore, as shown in the example of FIG. 2, the computer-readable instructions associated with scoring system 222 may include computer-readable instructions associated with a prerequisite system 232, a variable factor system 234, a reputation system 236, and a calculation system 238. In other examples, storage device(s) 216 may include computer-readable instructions associated with other systems or modules.

Data collection system 220 is configured to collect data regarding network entities 102. For example, data collection system 220 may query log data of network entities as part of collecting the data regarding network entities 102. In some examples, data collection system 220 may be configured to collect configuration and performance data regarding the network entities. The configuration and performance data may include snapshots of configuration data, snapshots of alarm data, and logs. Data collection system 220 may also collect information about network topology, enabling a determination of which network entities 102 are neighbors (i.e., are adjacent to each other in a network topology), and enabling collection and storage of other information about the network (e.g., network paths and routes through the network). Source data 228 may include the data collected by data collection system 220.

Data collection system 220 may also be configured to collect data that can be used to perform sentiment analysis. For example, data collection system 220 may integrate with one or more of input systems 103 (e.g., a trouble ticketing system) to collect the data relating to diagnostic or troubleshooting performed for one or more of network entities 102. In some examples, data collection system 220 may be configured to collect information from email, messaging, chat, and/or collaboration applications or other subjective material sources. Data collection system 220 may also collect information from one or more user devices, where such user devices are configured to present a user interface and collect comments from users about one or more of network entities 102. In one example, such a user interface may present a simplified free form comment box through a user interface, and prompt or enable users to input any comments they want regarding the trust of one or more of network entities 102. In such an example, data collection system 220 may collect such input and make the data available for subsequent sentiment analysis as described herein.

Data collection system 220 may store (as source data 228) sentiment information having a form other than simply text and user comments. For instance, in some examples, sentiment information could include information about a status or a change of state. In one such example, a user might provide a comment like "physical security in this site is badly maintained." If this comment is later removed (or otherwise nullified), sentiment information (e.g., "state information") having a sentiment polarity that is opposite to that of the original comment might be generated and stored within data collection system 220 as source data 228.

Scoring system 222 may use source data 228 to determine trust scores for network entities 102. Scoring data 230 may include the trust scores determined by scoring system 222 for network entities 102. In the example of FIG. 2, prerequisite system 232 may determine prerequisite sub-scores for network entities 102. Variable factor system 234 may determine variable factor sub-scores for network entities 102. Reputation system 236 may determine reputation sub-scores for network entities 102. Calculation system 238 may use one or more of the prerequisite sub-scores for a network entity, a variable factor sub-score for the network entity, or the reputation sub-score for the network entity to determine the trust score for the network entity.

Prerequisite system 232 may determine prerequisite sub-scores for network entities 102. That is, prerequisite system 232 may determine the trust score for a network entity based one or more prerequisites. Each of the prerequisites is a condition that must be satisfied for the trust score for a network entity not to have the minimum value. Prerequisite system 232 may evaluate the conditions to determine the prerequisite sub-score for a network entity. Prerequisite system 232 may store the prerequisite sub-scores for network entities 102 as scoring data 230. Example conditions may include whether the network entity is using a certified software release, whether the network entity is using a certified hardware release, and so on. Other prerequisites may include the network entity not using software versions that are known to be vulnerable, the network entity using only supported software or hardware versions, the network entity having the correct network time settings, the network entity having correct certificates for transport layer security (TLS) loaded, and so on. The conditions may be user-defined.

Variable factor system 234 may determine variable factor sub-scores for network entities 102. In other words, variable factor system 234 may assess sub-scores for each of several characteristics of a network entity. Each of the one or more variable factors for a network entity corresponds to one or more of the characteristics of the network entity. Variable factor system 234 may store the variable factor sub-scores for network entities 102 as scoring data 230. The characteristics may be user-defined. Examples of characteristics may include:

- Use of only approved applications on the network entity.
- Use of only signed applications on the network entity.
- Whether a release version of the network entity is a known-good version.
- A state or configuration of a network entity, e.g., if a recommended configuration is applied or not.
- Whether a software release version of a software application of the network entity is within a given number of releases of a current version of the software application.
- Rate limits for requests to be processed by a routing engine of a router.
- Limits on rates of possible network management interactions per time-period.
- Password strength requirements.
- Numbers and types of open network ports,

- Whether cryptographic keys are renewed more frequently than a threshold time limit.
- Sentiment analysis associated with a network entity, which may be determined by analysis system 231, as further described below.

Analysis system 231 may perform functions relating to sentiment analysis for a given entity. Sentiment analysis information may be used to determine a variable factor sub-score for one or more network entities 102, as described in connection with FIG. 3A and FIG. 3B. Analysis system 231 may apply this analysis as a component of trust. In examples described herein, analysis system 231 may be integrated into scoring system 222 so that variable factor system 234 and calculation system 238 calculate a trust score by considering sentiment analysis associated with network entities or amongst network entities (see calculations associated with Table 1, below). In other examples, however, analysis system 231 may be used to adjust (and thereby improve) trust scores that have already been determined by a scoring system, such as scoring system 222. In such examples, analysis system 231 may apply an adjustment to a trust score for an entity based on attitudinal information or sentiment analysis.

As part of calculating a trust score, variable factor system 234 may apply different weights to different characteristics to determine the variable factor sub-score for a network entity. Thus, specific characteristics may make greater contributions to the variable factor sub-score than other characteristics. Table 1, below, illustrates example contributions of specific choices (possible values) for specific characteristics of a network entity. As shown in the example of Table 1, software applications (apps) may be categorized into a plurality of classes (e.g., Class 1, Class 2, Class 3, etc.). The different classes of apps may correspond to different levels of risk. For instance, Class 1 apps may be limited to apps approved by a system vendor, signed applications, applications with security audits, etc., Class 2 apps may be limited to apps approved by a supplier, unsigned applications, applications with regular security updates, etc., Class 3 apps may be unapproved apps, and so on. In Table 1, the contribution column indicates a score that would be contributed if the corresponding choice in the "choices" column applies. In other examples, one or more choices may be associated with negative values, but the final variable factor sub-score may be limited to a minimum of zero or other predefined minimum value.

In Table 1, the "Sample Score" column provides an example of how a variable factor sub-score may be calculated for a specific network entity. Thus, in the example of Table 1, if the network entity used only Class 1 apps, variable factor system 234 may determine that the contribution for this characteristic ("Software") is 30. If a specific attribute of the network entity (e.g., software) is not a known good release, variable factor system 234 may determine that the contribution for the second characteristic is zero. If the network entity uses a software version that is within 3 releases of the most recent release of the software, variable factor system 234 may determine that the contribution for this third characteristic (e.g., "Software version<=last version-3") is 10. If the sentiment analysis for this network entity indicates a positive polarity, then variable factor system 234 may determine that the contribution for the "Sentiment" characteristic is 20. Based on such assessments, variable factor system 234 may determine that the variable factor sub-score is 60 (30+0+10+20). See Table 1, below.

TABLE 1

| | Characteristics | Contribution | Choices | Sample Score |
|---|---|---|---|---|
| Contributions within variable trust | Software (max 50%) | 30 | Class 1 apps only | 30 |
| | | 20 | Class 1 and Class 2 apps only | |
| | | 10 | Class 1, Class 2 and Class 3 apps | |
| | Is a known-good release | 40 | Yes | |
| | | 0 | No | 0 |
| | Software version <=last-3 | 10 | Yes | 10 |
| | | 0 | No | |
| | Sentiment (max 20%) | 20 | Positive | 20 |
| | | 5 | Neutral | |
| | | 0 | Negative | |
| | Total | | | 60 |

Reputation system 236 may determine reputation sub-scores for network entities 102. The reputation sub-score for a network entity may be based on one or more reputational factors for the network entity. Each of the reputational factors for the network entity is a function of specified historical events involving the network entity. The reputational factors for a network entity may be user-defined. The historical events may be defined to be those events that occur within a specific time period (e.g., 5 weeks, 10 weeks, 6 months, etc.). Reputation system 236 may store the reputation sub-scores for network entities 102 as scoring data 230. Example types of reputation factors may include:

- A number of temporal intervals (e.g., weeks, days, etc.) without a reset of the network entity.
- A number of temporal intervals (e.g., weeks, days, etc.) without a reboot of the network entity.
- A number of failed log-ins.
- Log-in frequency.
- Configuration frequency.
- A number of protocol timeouts or other runtime data Table 2, below, illustrates an example of how reputation system 236 may determine the reputation sub-score for a network entity. For instance, in Table 2, reputation system 236 may increase a reputation sub-score for the network entity by 5 for each month in which the network entity did not experience a reset. Furthermore, in Table 2, reputation system 236 may increase the reputation sub-score for the network entity by 15 for each month in which the network entity did not experience a reboot. Because the considered time period is 5 months, the maximum reputation sub-score, in this example, is 100.

TABLE 2

| | Factor | Choices | Contribution |
|---|---|---|---|
| Relative weights for items within reputation | Reputation per period without reset | | 5 |
| | Reputation per period without reboot | | 15 |
| | Interval | Month | |
| | Length of history considered | 5 | |
| | Maximum | | 100 |

Calculation system 238 may use one or more of a prerequisite sub-score for a network entity, a variable factor sub-score for the network entity, or a reputation sub-score for the network entity to determine the trust score for the network entity. When calculating a trust score for a network entity, calculation system 238 may determine that the trust score for the network entity indicates no trust if one or more of the prerequisite conditions are not satisfied (e.g., if the prerequisite sub-score has the minimum value, such as zero). In some examples, calculation system 238 determines the trust score for a network entity as a sum of the variable factor sub-score and the reputation sub-score. In some examples, calculation system 238 determines the trust score for a network entity as a weighted sum of the variable factor sub-score and the reputation sub-score. For instance, calculation system 238 may apply a 60% weight to the variable factor sub-score and a 40% weight to the reputation sub-score. In some examples, the weights applied to the variable factor sub-score and the reputation sub-score are user-defined. Thus, because the weights applied to the variable factor sub-score and reputation sub-score are user-defined, the ultimate trust score may be dependent on a user's priorities and preferences. In some examples, calculation system 238 may multiply the resulting sum (or weighted sum) by the prerequisite sub-score to determine the trust score for the network entity. In some examples, rather than trust controller 104 calculating a prerequisite sub-score, calculation system 238 may simply set the trust score for a network entity to the minimum value (e.g., zero) if any of the prerequisite conditions are not satisfied. Calculation system 238 may store the trust scores for network entities 102 into scoring data 230.

In some examples, scoring system 222 may aggregate the trust scores for two or more of network entities 102 to determine a trust score for a higher-order network entity. Example types of higher-order network entities may include networks, services, routes, and/or other collections of one or more network entities. Scoring system 222 may aggregate the trust scores in one of a variety of ways. For example, scoring system 222 may aggregate the trust scores for two or more of network entities 102 to determine a trust score for a higher-order network entity by taking a lowest trust score of the two or more network entities as the trust score for the higher-order network entity. In another example, scoring system 222 may aggregate the trust scores for two or more of network entities 102 to determine a trust score for a higher-order network entity as an average or sum of the trust scores for the two or more network entities.

Action system 224 may perform one or more actions based on the trust scores determined for network entities 102 by scoring system 222. For example, action system 224 may modify a traffic pattern of computer network 100 based on the trust score for the network entity. For instance, in this example, based on the trust score for the network entity, action system 224 may change the traffic pattern in computer network 100 to divert network traffic away from or direct the network traffic to the network entity. For instance, if the trust score for a network entity is below a specific threshold, action system 224 may change the traffic pattern in computer network 100 to divert network traffic away from the network entity. In some examples, if the trust score for a network entity is above a specific threshold, action system 224 may change the traffic pattern in computer network 100 to direct network traffic to the network entity. In such an example, based on a trust score of a network entity being greater than a particular threshold, action system 224 may change the traffic pattern by sending instructions to one or more routers in computer network 100 that cause the routers to change routes in computer network 100, and thereby cause those routers to route packets so that packets are directed along routes that lead to or through the network entity.

In another example, action system 224 may determine that there is a conflict of information between two sensors (e.g., in the context of an airplane, an angle of attack sensor and a nose pitch sensor). In this example, action system 224 may perform one or more actions based on the trust scores for the sensors (i.e., network entities) in response to determining such a conflict. For instance, action system 224 may generate a notice to an operator recommending use of information from the sensor with a greater trust score. In another example, action system 224 may disable the sensor with the lower trust score. In some examples, action system 224 may recommend a probe or obtain a combination of other sensor data to determine which of the two sensors is more likely to be generating accurate data. In an example where the network entities include multiple clock sources (e.g., Precision Time Protocol (PTP) clock sources), action system 224 may change a master clock source from a current clock source to a back-up clock source due to the back-up clock source having a greater trust score than the current clock source. In some examples, action system 224 may identify routes through network 100 based on trust scores for network entities in network 100. Thus, action system 224 may configure routers to route network traffic along routes that pass-through network entities having high trust scores.

Action system 224 may also perform other types of actions based on the trust scores determined for network entities 102 by scoring system 222. For instance, action system 224 may determine or adjust configurations associated with firewall 192 based on a trust score for network entity 102A that is below a specified trust threshold. Such an adjustment may minimize or limit ports on firewall 192 that enable interaction with network entity 102A. In another example, action system 224 may interact with one or more of access control system 193 to limit access to devices with trust scores below a threshold. Action system 224 may interact with asset management system 194 to mark one or more devices as unavailable when a trust score is below a certain threshold, or where the trust score is trending downward. Action system 224 may also raise alarms to indicate that trust scores associated with one or more of network entities 102 are low, are trending lower, and/or have trended below a given threshold.

Tracking system 226 may track changes in trust scores and/or sub-scores and reevaluate the level of trust associated with one or more entities. Tracking system 226 may collect information from source data 228 and determine changes in trust scores and/or sub-scores associated with one or more network entities 102. Tracking system 226 may determine, based on historical information about trust scores for each of network entities 102, which of network entities 102 need service, such as an upgrade, audit, review, test, or other evaluation. Tracking system 226 may monitor sentiment associated with one or more network entities 102, and adjust trust scores as that sentiment changes. In some examples, tracking system 226 may also identify one or more network entities 102 having consistently high trust scores and implement a tendency to use such network entities 102 for high priority, high importance, or mission-critical tasks.

Inference system 221 may perform functions relating to inferring trust scores for a given entity based on a distance, separation, or locality of that entity from the perspective of another entity. Inference system 221 may apply this inferred trust as a component of trust or as a degree of trust. In some examples, inference system 221 may be used to adjust (and thereby improve) trust scores determined by scoring system 222. In such an example, inference system 221 may apply an adjustment to a trust score for an entity that is based on a degree of separation between an entity and another entity whose trust is being assessed, where the degree of separation corresponds to a distance, a count of intervening entities, or a locality associated with the entity being assessed.

For example, in FIG. 1A, if network entity 102E has a trust score of 70, network entity 102C, which is adjacent to network entity 102E, may view network entity 102E as having a trust score of 70. If network entity 102C has trust score 80, then network entity 102A, which is adjacent to network entity 102C, may view network entity 102C as having a trust score of 80. However, the trust score that network entity 102A associates with network entity 102E may be a function of the trust scores for network entity 102C, network entity 102E, and the number of intervening network entities between network entity 102A and 102E. Such a function may be described as follows:

trust score of 102A=function(trust score of 102C, trust score of 102E, count of intervening entities between 102A and 102E)

Where the count of intervening entities is high, the trust score may be reduced. Where the count is low, the trust score may be higher.

In other examples, inference system 221 may be integrated into scoring system 222 so that calculation system 238 calculates a trust score by considering inferences about trust amongst network entities 102.

In an example where inference system 221 or aspects of inference system 221 are integrated into scoring system 222, both variable factor system 234 and reputation system 236 may use trust inferences or information derived from trust inferences to make variable and reputational assessments, respectfully. Variable factor system 234 may recalculate trust scores, for example, as new entities get added and new trust inferences are determined. Reputation system 236 may assess whether trust inferences between entities improve or deteriorate over time. In such an example, Tables 1 and 2, described above, might be modified and relabeled as Tables 1A and 2A, as follows:

TABLE 1A

| | Characteristics | Contribution | Choices | Sample Score |
|---|---|---|---|---|
| Contributions within variable trust | Software (max 50%) | 30 | Class 1 apps only | 30 |
| | | 20 | Class 1 and Class 2 apps only | |
| | | 10 | Class 1, Class 2, and Class 3 apps | |
| | Is a known-good release | 40 | Yes | |
| | | 0 | No | 0 |
| | Software version <=last-3 | 10 | Yes | 10 |
| | | 0 | No | |
| | Sentiment (max 20%) | 20 | Positive | 20 |
| | | 5 | Neutral | |
| | | 0 | Negative | |
| | Change in degree of separation | 0-N | Range | 4 |
| | Total | | | 64 |

TABLE 2A

| | Factor | Choices | Contribution |
|---|---|---|---|
| Relative weights for items within reputation | Reputation per period without reset | | 5 |
| | Reputation per period without reboot | | 15 |
| | Interval | Month | |
| | Length of history considered | 5 | |
| | Change in neighbor score | 3 | 4 |
| | Maximum | | 100 |

Scoring system 222 may use trust inferences or information derived from such trust inferences to supplement existing metrics, thereby improving accuracy of scoring system 222. In general, inference system 221 may receive information from and output information to one or more other systems or modules within storage devices 216, and may otherwise interact with and/or operate in conjunction with one or more other systems and/or modules of trust controller 104.

Various systems illustrated in FIG. 2 (e.g., data collection system 220, inference system 221, scoring system 222, action system 224, tracking system 226, prerequisite system 232, variable factor system 234, reputation system 236, calculation system 238) may be implemented as modules or other logic. In such an example, such modules illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
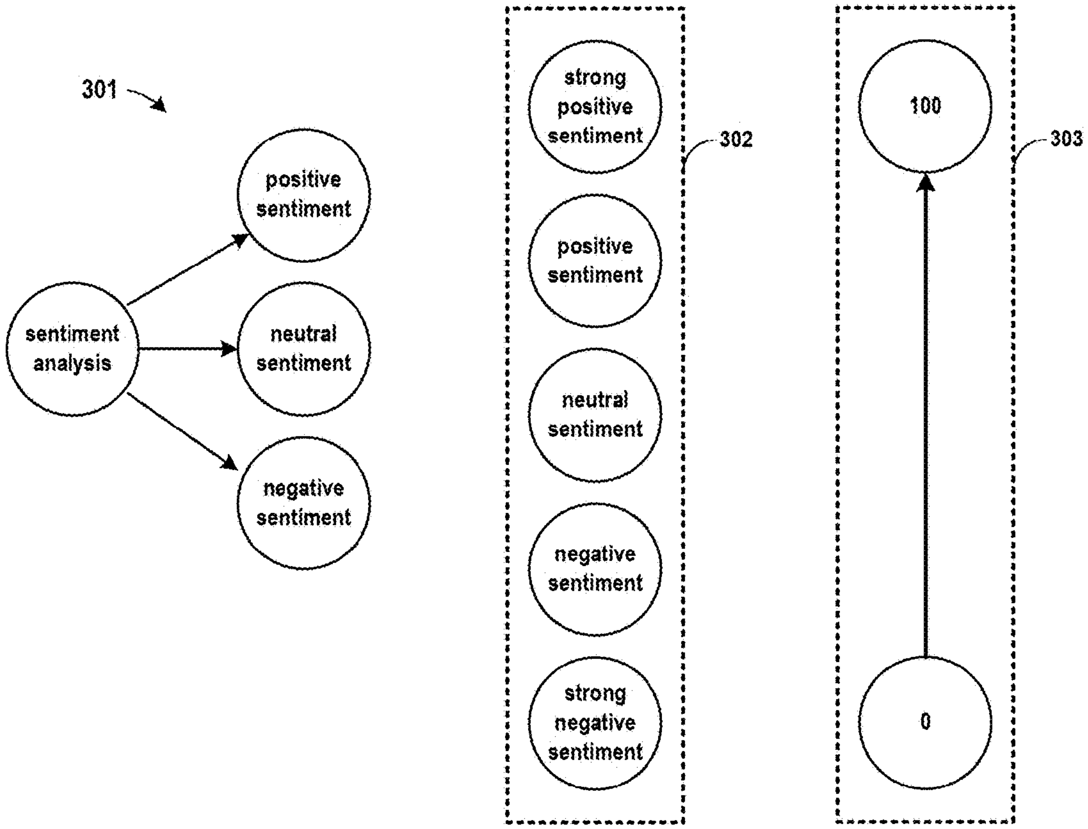
FIG. 3A is a conceptual diagram illustrating one example of how sentiment for a network entity (or a group of network entities) might be classified, in accordance with one or more aspects of the present disclosure.

FIG. 3A is a conceptual diagram illustrating three examples of how sentiment for a network entity (or a group of network entities) might be classified, in accordance with one or more aspects of the present disclosure. In the example of FIG. 3A, sentiment analysis performed on data (e.g., text) associated with an entity (e.g., one of network entities 102 of FIG. 1A) may result in a categorization of the sentiment for that network entity 102 into one of three categories: positive, neutral, or negative. (See classification 301 on left side of FIG. 3A.) In other examples, sentiment analysis may generate an output of a different form. Such an output may take the form of a simple binary classification having just two values (e.g., positive or negative, positive or neutral, neutral or negative). Such an output may take the form of a more complex classification, which may have additional categories (e.g., four or five), such as in the alternative classification 302 shown in FIG. 3A. In another classification scheme, the output could take the form of a sentiment score (e.g., 1-100), such as is shown in the alternative classification 303 shown in FIG. 3A.

In some examples, additional classification can occur to identify specific attributes of the sentiment, potentially identifying anger, annoyance, surprise, or other emotions. Such additional attributes of the sentiment may, in some cases, be used by trust controller 104 (e.g., by variable factor system 234 or calculation system 238) to determine a classification in a more complex classification scheme (e.g., a score ranging from 1 to 100).

Figure 3B:
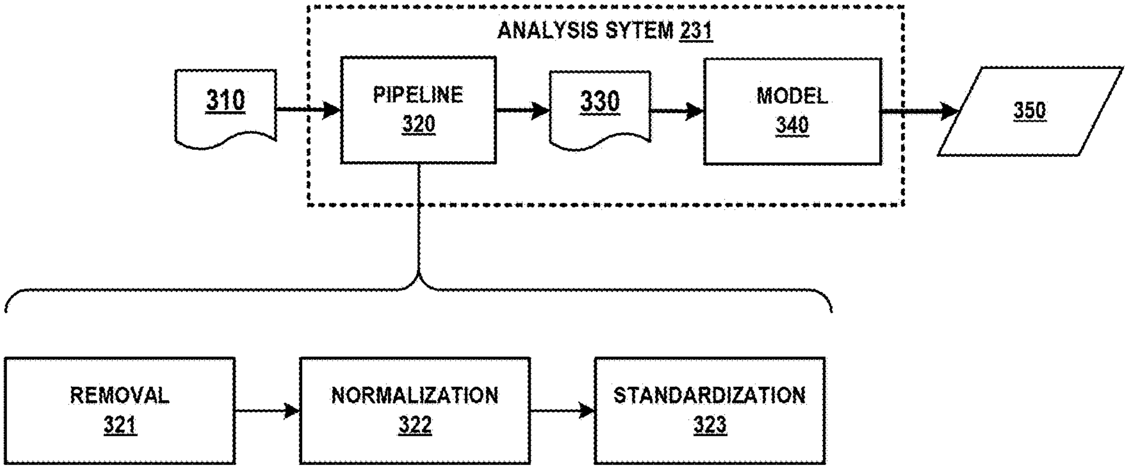
FIG. 3B is a block diagram illustrating an example system for determining a sentiment classification for one or more network entities, in accordance with one or more aspects of the present disclosure.

FIG. 3B is a block diagram illustrating an example system for determining a sentiment classification for one or more network entities 102, in accordance with one or more aspects of the present disclosure. FIG. 3B illustrates analysis system 231, which includes pipeline 320 and machine learning model 340. Analysis system 231 may be an example of how analysis system 231 of trust controller 104 in FIG. 2 might be implemented (e.g., see FIG. 2).

In FIG. 3B, pipeline 320 of analysis system 231 translates raw text 310 into cleaned text 330 suitable for natural language processing. Machine learning model 340 applies a model to cleaned text 330 to predict a sentiment classification 350. As illustrated in FIG. 3B, pipeline 320 is implemented through removal module 321, normalization module 322, and standardization module 323.

Removal module 321 may perform tasks relating to removing noisy entities from raw text 310, which may include removing HTML tags, certain punctuation, white space, URLs, and other information not appropriate for consideration by machine learning model 340. Removal module 321 may also perform "stop word" removal (i.e., removal of words which are generally filtered out before processing natural language text) which can be supported through Naive Bayes.

Normalization module 322 may perform tasks relating to tokenization of or lemmatization of raw text 310 or text that has been processed by removal module 321. Lemmatization may involve grouping together the inflected forms of a word so they can be analyzed as a single item. Normalization module 322 may also process raw text 310 (or text processed by removal module 321) by stemming or performing sentence segmentation on such text.

Standardization module 323 may perform word standardization tasks on text received from normalization module 322, which may involve performing regular expression operations on such text. In doing so, standardization module 323 may also use one or more lookup tables to process text appropriate.

Machine learning model 340 may be a model trained to identify sentiment from data, such as text. Machine learning model 340 may be a model based on linear regression machine learning techniques, a Support Vector Machines model, and/or a long short-term memory (LSTM) model that uses, for example an artificial recurrent neural network (RNN) architecture.

Sentiment classification 350 may be a category classification consistent with any of the forms described in connection with FIG. 3A. Sentiment classification 350 may also be a score representing a prediction by analysis system 231 of a sentiment associated with raw text 310 along a continuum of sentiment values.

Aspects of FIG. 3B are described herein in the context of FIG. 1A and FIG. 2. In such examples, analysis system 231 of FIG. 3B corresponds to analysis system 231 of trust controller 104 in FIG. 2. Accordingly, analysis system 231 of FIG. 3B can be considered a component of trust controller 104 of FIG. 2. Other implementations are possible, however, and operations described herein as being performed by analysis system 231 or any other system, device, or module described herein may, in other examples, be performed by a different system, device, or module.

In FIG. 3B. and in accordance with one or more examples of the present disclosure, trust controller 104 of analysis system 231 may store raw text 310. For instance, in an example that can be described in the context of FIG. 1A, FIG. 2 and FIG. 3B, data collection system 220 of trust controller 104 causes communication unit 204 of trust controller 104 to output a signal over network 100. One or more of input systems 103 in FIG. 1A detect a signal and determine that the signal corresponds to a request for data that can be used to perform a sentiment analysis on one or more of network entities 102. One or more of input systems 103 output a signal over network 100. Communication unit 204 of trust controller 104 detects a series of signals and outputs to data collection system 220 information about the signals. Data collection system 220 determines that the signals correspond to data, such as text, that can be analyzed to determine a sentiment associated with one or more of network entities 102. Data collection system 220 outputs information about the data to source data 228. As stored within source data 228, the information about the data corresponds to raw text 310 of FIG. 3B.

Analysis system 231 may process raw text 310 through a pipeline of operations to generate cleaned text 330. For instance, continuing with the example being described in the context of FIG. 1A, FIG. 2, and FIG. 3B, analysis system 231 accesses raw text 310 within source data 228 and causes pipeline 320 of FIG. 3B to perform operations on raw text 310. Such operations may include removal of noisy entities or artifacts from raw text 310 (e.g., performed by removal module 321 in FIG. 3B). Normalization module 322 of FIG. 3B receives the output of removal module 321 and tokenizes and/or groups together inflected forms of various words included within text received from removal module 321, thereby enabling such words to be analyzed as a single item. Standardization module 323 applies regular expression techniques to the output of normalization module 322 in order to standardize words included within raw text 310. Standardization module 323 generates cleaned text 330.

Analysis system 231 may generate sentiment classification 350. For instance, continuing with the example being described, analysis system 231 applies machine learning model 340 in FIG. 3B to cleaned text 330. Machine learning model 340 predicts a classification based on cleaned text 330. Machine learning model 340 outputs sentiment classification 350. Analysis system 231 stores information about sentiment classification 350 within scoring data 230.

Trust controller 104 may generate or update a trust score for one or more of network entities 102. For instance, continuing with the example being described, calculation system 238 of trust controller 104 detects that new sentiment classification 350 is available for one of network entities 102 of FIG. 1A. Calculation system 238 determines that the new sentiment classification 350 pertains to network entity 102C. Calculation system 238 calculates or recalculates a trust score for network entity 102C, and uses the new sentiment classification 350 as a factor considered by variable factor system 234, as described above in connection with Table 1 and 1A. Calculation system 238 updates the trust score for network entity 102C and stores the updated trust score as scoring data 230.

Trust controller 104 may act on the trust score that is based on the new sentiment classification 350. For instance, once again referring to FIG. 1A, FIG. 2, and FIG. 3B, action system 224 accesses information about the updated trust score for network entity 102C. Action system 224 determines that the updated trust score for network entity 102C is significantly lower than a previously calculated trust score for network entity 102C. Action system 224 causes communication unit 204 of trust controller 104 to output a signal over network 100. Firewall 192 detects a signal over network 100 and determines that the signal corresponds to a command to adjust firewall settings to limit access to network entity 102C. Firewall 192 adjusts its firewall settings and continues operations, thereafter, limiting access to network entity 102C.

In the example described action system 224 acts on the lower trust score associated with network entity 102C by making adjustments to firewall 192. In other examples, action system 224 may perform other or additional actions. Such actions may include redirecting routes or adjusting routing algorithms, such as through communications with router 191 and/or one or more of network entities 102. Such actions may also include adjusting configurations of access control system 193, thereby limiting access to one or more network entities 102 within network 100. Such actions may also include adjustments to settings associated with asset management system 194, such as marking one or more of network entities 102 as unavailable. Such actions may also include adjusting settings of alarm system 195 thereby triggering more or fewer alarms, based on the change in the trust score associated with network entity 102C, or based on the new configurations of network 100 made in response to the lower trust score associated with network entity 102C.

Note that in some examples, action system 224 may perform corresponding operations when trust scores trend in the positive direction as well. For instance, if action system 224 determines that the updated trust score for network entity 102C is higher than a previously calculated trust score for 102*c*, action system 224 may decide not to act on the change in trust score. However, in some examples, action system 224 may act on such a change, potentially performing actions consistent with network entity 102C being more trusted within network 100. Such actions may involve adjusting routing algorithms to include network entity 102C, or adjusting configurations of firewall 192, access control system 193, and/or asset management system 194 to enable less restricted access to network entity 102C. Such actions may alternatively, or in addition, involve adjusting alarm system 195 to trigger more or fewer alarms in response to the change in the trust score for network entity 102C or based on any new configurations of network 100 made in response to the change.

In some cases, sentiment analysis may tend to be biased toward negative results, particularly if human-generated text (emails, trouble tickers, messaging, user interface interactions) is primarily used as raw text 310 to generate sentiment classification 350. In other words, sentiment analysis will, in some examples, generate a specific polarity (positive, neutral or negative) based on raw text 310, which may be an excerpt of text typed by a user or transcribed from audio. In some systems, such human-generated text might only be available when a problem arises, so that much of the text will tend to pertain to negative sentiment. In those systems, when a device operates properly, it may be that no text is generated to document the proper operation of the device. To address this potential bias, machine learning model 340 may be trained to take the bias into account, and thereby still accurately determine sentiment polarities.

Alternatively, or in addition, additional data may be used to counteract the bias. For example, even where most of the subjective text derived from trouble tickets will tend to be classified as negative sentiment, positive sentiment can be inferred from a trouble ticket being closed (i.e., an earlier problem that has been resolved). Analysis system 231 may also chain trust factors or trust events together, such that one event depends on another. In such a system, negative sentiment that may arise from the opening of a trouble ticket for one or more of network entities 102 may be counteracted by positive sentiment of that trouble ticket being closed. One way to counteract the opening of a ticket (with negative sentiment text) and closing of the ticket (perhaps with little or no text) would be to chain the ticket opening and closing events together, and thereby ensure that analysis system 231 assesses the positive sentiment associated with closing the ticket in a manner that is appropriate considering any negative assessment that was associated with the opening of the ticket.

Further, to the extent that machine learning model 340 may generate inaccurate predictions, machine learning model 340 may be retrained (e.g., by trust controller 104 or another system) to consider input data that resulted in inaccurate predictions. Through proper retraining, any false or incorrect sentiment polarities predicted by machine learning model 340 may be addressed, and thereby improve the skill of machine learning model 340 over time. In some cases, new training examples based on incorrect predictions may be identified by an administrator (e.g., through a user interface). In some models, it may be appropriate to adjust the contribution (weighting) component of a trust score (e.g., contributions and/or weights associated with characteristics or factors applied in Tables 1 and 2).

Figure 4:
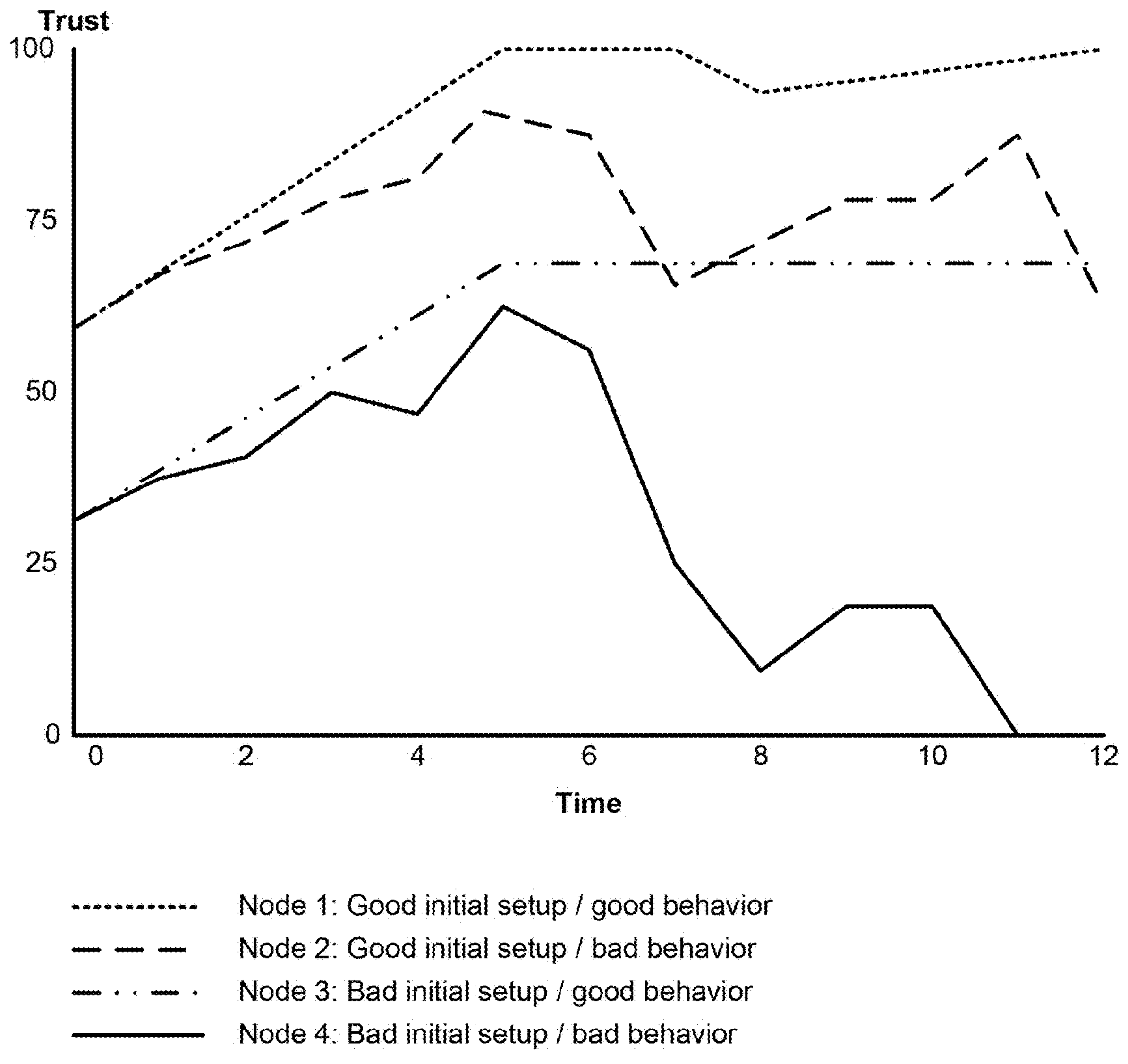
FIG. 4 is a chart illustrating that trust scores can change over time, in accordance with one or more aspects of this disclosure.

FIG. 4 is a chart illustrating that trust scores can change over time, in accordance with one or more aspects of this disclosure. In some examples, tracking system 226 of trust controller 104 may track changes in trust scores and/or sub-scores and reevaluate the level of trust associated with one or more entities. Trust controller 104 may use information regarding changes in trust scores and/or sub-scores for various purposes. For example, trust controller 104 may use historical information regarding trust scores for network entities to determine which network entities need attention (e.g., need to be upgraded, audited, reviewed, tested, etc.). In other examples, trust controller 104 may use such historical information to identify network entities having consistently high trust scores and configure network 100 to utilize the identified network entities for high-priority tasks, such as for urgent communications during emergencies).

In the example of FIG. 4, a "good initial setup" might mean that all pre-requisites are met and the variable and reputational factors result in a "good" initial score. "Behavior" may represent actions that change the trust score over time. Where trust or a trust score does not deteriorate or decrease, behavior may be considered "good." Where a trust score does deteriorate, behavior might be considered "bad." Behavior might deteriorate based on one or more of the characteristics evaluated by variable factor system 234 changing over time. For example, where analysis system 231 assesses that an assessment of new data associated with an indicates a negative polarity sentiment, variable factor system 234 may determine that the variable factor trust score for that entity has decreased (e.g., see Table 1 or 1A), which may translate into a downward sloping trust score line. In some examples, such as where subsequent positive sentiment information is identified by analysis system 231, the variable factor trust sub-score for that same entity may later increase, which may translate into an upward sloping trust line.

Figure 5A:
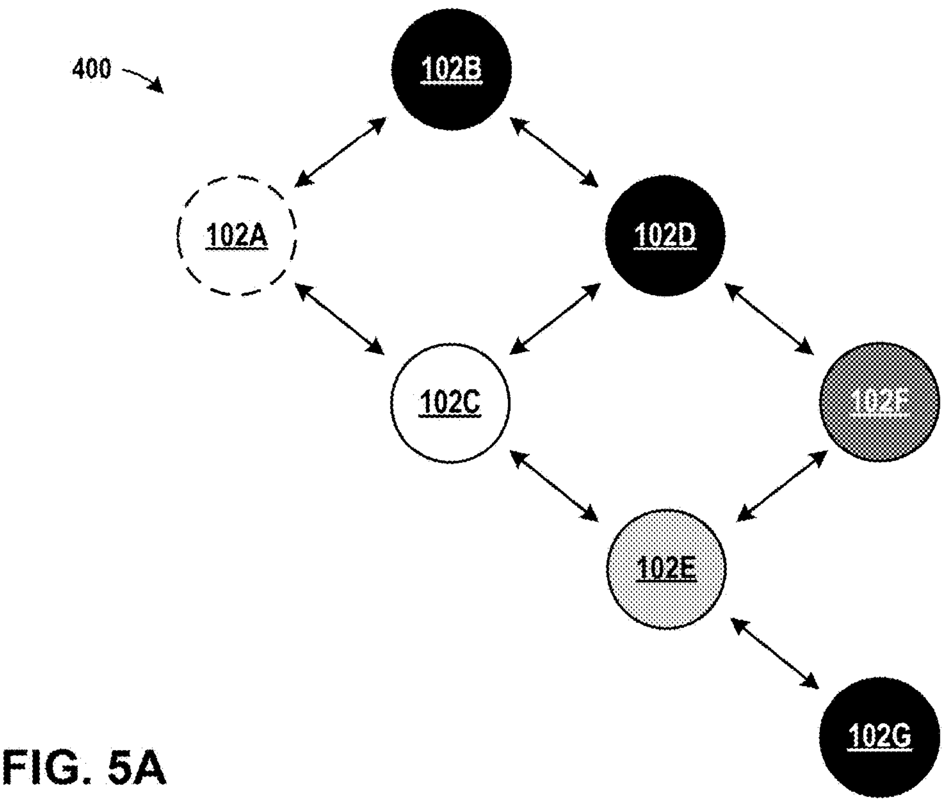
FIG. 5A is a conceptual diagram illustrating how trust might be inferred based on attributes of entities that separate one entity from another entity, in accordance with one or more aspects of this disclosure.

FIG. 5A is a conceptual diagram illustrating how trust might be inferred based on attributes of entities that separate one entity from another entity, in accordance with one or more aspects of this disclosure. In FIG. 5A, network 500 includes network entities 102 that generally correspond to those of FIG. 1A. Bidirectional connections are illustrated between neighboring or connected entities. In FIG. 5A, network entity 102A and network entity 102C are neighboring entities, or are adjacent to each other, since network entity can, for example, send data directly to the other network entity without first sending network data through another network entity. Network entity 102A is "separated" from network entity 102E, however, since data transferred from network entity 102A to network entity 102E would traverse at least one other network entity (e.g., network entity 102C). Network entity 102A and network entity 102E might be considered to be separated by one other network entity, since the shortest path between the two network entities involves one other network entity. Attributes of the separation ("attributes of separation") between two network entities might include the number of other network entities that separate the network entities (e.g., a "degree of separation" or a "count of entities," which would have a value of one for network entities 102A and 102E), the type of entities that separate the network entities, information about the path between the network entities, or other information.

Also, in FIG. 5A, network entities 102 are illustrated with varying degrees of shading, where the shading indicates a level of trust from the perspective of network entity 102A (note that 102A is drawn with a dotted line). Network entities 102 that are shaded are considered untrusted from the perspective of network entity 102A; network entities 102 having little or no shading are considered trusted from the perspective of network entity 102A. In some examples, a binary trust relationship might apply such that neighbors might be classified simply as either trusted or untrusted. However, in at least some illustrations shown herein (including FIG. 5A), a continuum of trust may apply, such that network entities 102 that are more darkly shaded than other network entities 102 are considered less trusted.

Trust controller 104 may determine a trust score for one or more network entities 102 within network 500. For instance, trust controller 104 may calculate a trust score for one or more of network entities 102A through 102G by applying scoring system 222 to attributes of each of network entities 102 in the manner described above in connection with FIG. 2. In another example, however, trust controller 104 may use an alternative method for determining trust scores.

In an example where trust controller 104 applies scoring system 222 as described in connection with FIG. 2, trust controller 104 may apply prerequisite system 232, variable factor system 234, reputation system 236, and calculation system 238 to arrive at trust scores for at least some of network entities 102. For instance, in FIG. 5A and with reference to trust controller 104 of FIG. 2, prerequisite system 232 of trust controller 104 assesses prerequisites for each of network entities 102A through 102G. Prerequisite system 232 identifies which network entities 102 satisfy and which do not satisfy required prerequisites. Those network entities 102 that do not satisfy the prerequisites are marked as untrusted.

For those network entities 102 that do satisfy the prerequisites, variable factor system 234 of trust controller 104 determines variable factor sub-scores for each such network entity 102. For instance, as described in connection with FIG. 2, variable factor system 234 may apply appropriate weights to different characteristics (e.g., software characteristics, sentiment) to determine the variable factor sub-score for each of network entities 102 (or at least for those network entities 102 that satisfied the prerequisites). Variable factor system 234 stores the variable factor sub-scores for network entities 102 as scoring data 230.

Also, for those network entities 102 that do satisfy the prerequisites, reputation system 236 of trust controller 104 determines reputation sub-scores for each of such network entities 102. For instance, also as described in connection with FIG. 2, reputation system 236 may apply weights to various factors, attributes, or characteristics of each network entity 102 to assess a reputational sub-score. Reputation system 236 may also evaluate historical data within a specific time period. Reputation system 236 calculates a reputational sub-score for each of network entities 102 (or at least for network entities 102 meeting the prerequisites). Reputation system 236 stores the reputational sub-scores for network entities 102 as scoring data 230.

Calculation system 238 may use the variable factor sub-scores and the reputational sub-scores to calculate a trust score. For instance, again referring to FIG. 2 and FIG. 5A, calculation system 238 accesses scoring data 230, which includes the sub-scores stored by variable factor system 234 and reputation system 236. Calculation system 238 uses the accessed sub-scores to determine a trust score for each of network entities 102. In one example, calculation system 238 sums the sub-scores to arrive at a trust score. In some examples, calculation system 238 may multiply the resulting sum (or weighted sum) by the prerequisite sub-score to determine respective trust scores for each of network entities 102. Calculation system 238 stores the trust scores for each of network entities 102 as scoring data 230. Such scores might be calculated for just those network entities 102 that satisfied the prerequisites evaluated by prerequisite system 232. In situations where prerequisite system 232 determined that one or more of network entities 102 did not satisfy one or more prerequisites, calculation system 238 may determine that for any such network entity 102 that did not satisfy a prerequisite, the trust score is zero.

Trust controller 104 may also determine information about the degree of trust between neighbors or connected entities in FIG. 5A. For instance, in an example that can be described with reference to FIG. 5A, trust controller 104 (see FIG. 1A) determines a set of trust inferences for each of network entity 102A through 102G, where such trust inferences indicate, from the perspective of a specific network entity 102, a degree of trust between that specific network entity 102 and other network entities 102. FIG. 5A shows the trust inferences from the perspective of network entity 102A, and network entity 102A is drawn with a dotted line to indicate that the trust inferences shown in FIG. 5A are from the perspective of network entity 102A. As described above, the other network entities 102 that are unshaded are considered trusted from the perspective of network entity 102A. Network entities 102 that are shaded are considered untrusted from the perspective of network entity 102A.

In the example shown in FIG. 5A, trust controller 104 may use trust calculations for each of network entities 102 to determine a degree to which network entity 102A can trust other network entities 102. For instance, in FIG. 5A, trust controller 104 determines whether network entity 102A can trust another entity by assessing whether such other entities are trusted by an entity that is already trusted by network entity 102A. For example, in FIG. 5A, network entity 102A trusts network entity 102C (network entity 102C is shown unshaded, or trusted from the perspective of network entity 102A), but network entity 102A does not trust network entity 102B (network entity 102B is shown shaded, indicating a lack of trust from the perspective of network entity 102A). Further, based on an analysis performed by trust controller 104, trust controller 104 has determined that network entity 102C trusts network entity 102E, but network entity 102C does not trust network entity 102D. Further, trust controller 104 has determined that network entity 102E trusts network entity 102F, but does not trust network entity 102G.

Using such information, trust controller 104 determines that from the perspective of network entity 102A, network entity 102E has some positive degree of trust (i.e., is trusted to some degree by network entity 102A). Specifically, inference system 221 of trust controller 104 (see FIG. 2) accesses information about network topology within source data 228 and determines that network entity 102C is adjacent to (i.e., is a neighbor to) network entity 102A. Inference system 221 also determines, based on the topology, that network entity 102E is not adjacent to (not a "neighbor" of) network entity 102A, but that network entity 102E is adjacent to network entity 102C.

Inference system 221 uses such information to determine that from the perspective of network entity 102A, network entity 102E is trusted because network entity 102C trusts neighboring network entity 102E, and network entity 102A trusts network entity 102C, which is a neighbor to network entity 102A. Based on these attributes, trust controller 104 determines that network entity 102E is trusted by network entity 102A. And while inference system 221 may determine that from the perspective of 102A, network entity 102E is trusted, inference system 221 might also determine that network entity 102E is not trusted by network entity 102A as much as network entity 102C is trusted by network entity 102A. Inference system 221 may make such a determination at least because network entity 102E is more distant from network entity 102A (i.e., network entity 102E has a higher degree of separation—e.g., a higher count of intervening devices or entities—from network entity 102A than network entity 102C has from network entity 102A).

Trust controller 104 may also determine that from the perspective of network entity 102A, network entity 102F is also trusted, or at least has some positive degree of trust. Inference system 221 of trust controller 104 makes this determination (i.e., that network entity 102F can be trusted by network entity 102A) based on the network topology and based on information indicating that network entity 102E trusts network entity 102F and network entity 102A trusts network entity 102E. However, based on the additional degree of separation between network entity 102F relative to network entity 102E, network entity 102A may trust network entity 102F less than it trusts network entity 102E.

Trust controller 104 may also identify one or more network entities 102 that, from the perspective of network entity 102A, are not trusted. For example, inference system 221 of trust controller 104 may determine that from the perspective of network entity 102A, network entity 102D is not trusted because, as described above, network entity 102D is not trusted by network entity 102C. Similarly, inference system 221 may determine that from the perspective of network entity 102A, network entity 102G is not trusted because, also as described above, network entity 102G is not trusted by network entity 102E.

Trust controller 104 may enable, based on the level of trust that the network entity 102A has for network entity 102E, network entity 102A to perform an operation with network entity 102E. For instance, in the example of FIG. 5A and with reference to FIG. 2, action system 224 may determine that network entity 102A trusts network entity 102E, so action system 224 may place network entity 102E on an access control list or the trust may be used to influence a decision about whether to place one or more network entities on an access control list.

In another example, action system 224 may, if network entity 102A trusts network entity 102E, route traffic along a path that includes network entity 102E. However, in an example in which action system 224 determines that network entity 102A does not trust network entity 102E, action system 224 may choose to route traffic along a path that does not include network entity 102E. In some examples, action system 224 may actively prevent traffic from flowing through network entity 102E by identifying network traffic that is queued to traverse network entity 102E and adjusting network flows so that at least some of the network traffic does not traverse network entity 102E.

Where the level of trust represents a continuum of values (e.g., trust "scores," where higher values representing more trust that lower values), action system 224 may determine that network 102A trusts network entity 102E if the level of trust between network 102A and network entity 102E exceeds a threshold value, in which case action system 224 may enable network entity 102A to perform one or more operations with network entity 102E. Where the level of trust does not exceed the threshold value, action system 224 might not enable network entity 102A to perform one or more operations with network entity 102E.

In the example of FIG. 5A, trust controller 104 is described as assessing trust relationships, assigning trust scores, and performing operations to infer trust. In other examples, however, such operations may be performed by one or more of network entities 102 individually, such that trust scores and/or trust relationships are assessed in a distributed manner. In such an example, information about trust scores and/or trust relationships can be stored locally, in each of network entities 102. In other examples, such information may be assessed in a distributed manner, but still stored in a single location that each of network entities 102 can access. For entities that contain processors, or entities and that have sufficient computing capability to make assessments about trust based on data that it collects or that another entity or computing device collects, information about trust scores and/or trust relationships may be calculated or determined by individual network entities 102, rather than by trust controller 104. In such an example, a data sharing mechanism may be in place to enable sharing of data, even between entities that do not trust each other. Trust inference data can be exposed through an application programming interface or can be shared between entities and/or computing systems using a protocol.

Figure 5B:
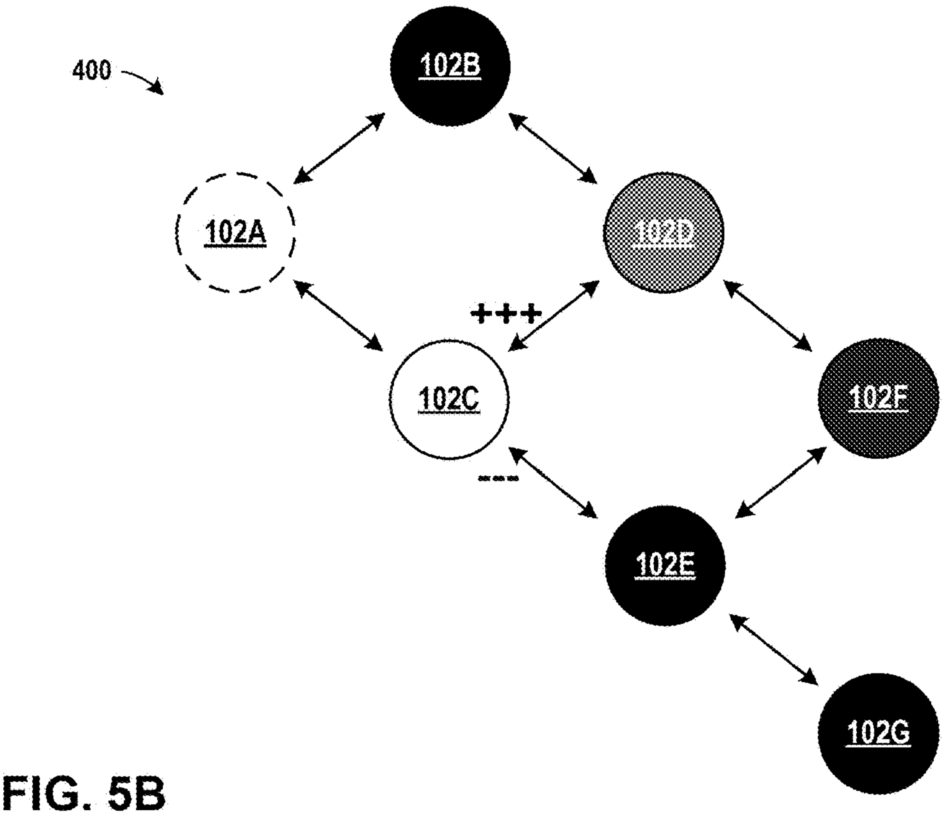
FIG. 5B is a conceptual diagram illustrating how a change in the level of trust between entities might affect a degree of trust between other entities, in accordance with one or more aspects of this disclosure.

FIG. 5B is a conceptual diagram illustrating how a change in the level of trust between entities might affect a degree of trust between other entities in the diagram of FIG. 5A, in accordance with one or more aspects of this disclosure. FIG. 5B illustrates the same network 500 as shown in FIG. 5A, except that in FIG. 5B, the level of trust between network entity 102C and network entity 102D has changed, as has the level of trust between network entity 102C and network entity 102E. Specifically, the degree of trust between network entity 102C and network entity 102D has increased so that network entity 102C now trusts network entity 102D to some extent (previously, in FIG. 5A, network entity 102C did not trust network entity 102D). The increase in trust is indicated by the "+++" shown in FIG. 5B. Also in FIG. 5B, the degree of trust between network entity 102C and network entity 102E has decreased, so that network entity 102C now trusts network entity 102E less than it did in FIG. 5A (see the "---" notation in FIG. 5B).

Trust controller 104 may determine the extent to which a change in trust might affect one or more trust inferences for network entity 102A. For instance, with reference to FIG. 5B and FIG. 2, router 121 of trust controller 104 detects input from tracking system 226. Inference system 221 determines that the input corresponds to information about a change in trust among network entities 102. For example, inference system 221 determines that network entity 102C has updated its software to a version that is more recent and/or is more reliable. Inference system 221 may also, for example, determine that network entity 102E required one or more additional reboot operations to address issues with performance of network entity 102E. Accordingly, inference system 221 determines, based on this information, that the degree to which network entity 102C trusts network entity 102D has increased, and the degree to which network entity 102C trusts network entity 102E has decreased. Where the level of trust is expressed in terms of a trust score, inference system may increase the score associated with the trust that network entity 102C has for network entity 102D, but decrease the score associated with the trust network entity 102C has for network entity 102E. Where the level of trust is expressed in terms of a category, inference system 221 may thereafter classify network entity 102D with a more highly trusted category, and may thereafter classify network entity 102E with a less trusted category.

Inference system 221 determines that the change in trust among network entities 102 affects the set of trust inferences for network entity 102A with respect to various network entities 102, even though the degree of separation (e.g., the number of network entities) between network entity 102A and other network entities 102 has not changed. As described, inference system 221 modifies the trust inferences for network entity 102A so that network entity 102A now trusts network entity 102D to some extent (whereas before, network entity 102A did not trust network entity 102D). To reflect this change, network entity 102D is now shaded less darkly in FIG. 5B than in FIG. 5A. Also, inference system 221 modifies the trust inferences so that network entity 102A now trusts network entity 102E less than it did prior to detecting the change in trust among network entities 102 (note the increased shading in network entity 102E in FIG. 5B).

In some examples, inference system 221 may also determine that the changes in trust between network entity 102C and network entity 102D and network entity 102E may affect the trust network entity 102A has in network entity 102F. Note, for example, both network entity 102D and network entity 102E are on a path from network entity 102A to network entity 102F. In such an example, the level of trust network entity 102A has in network entity 102F may decrease, as illustrated in FIG. 5B.

Figure 6A:
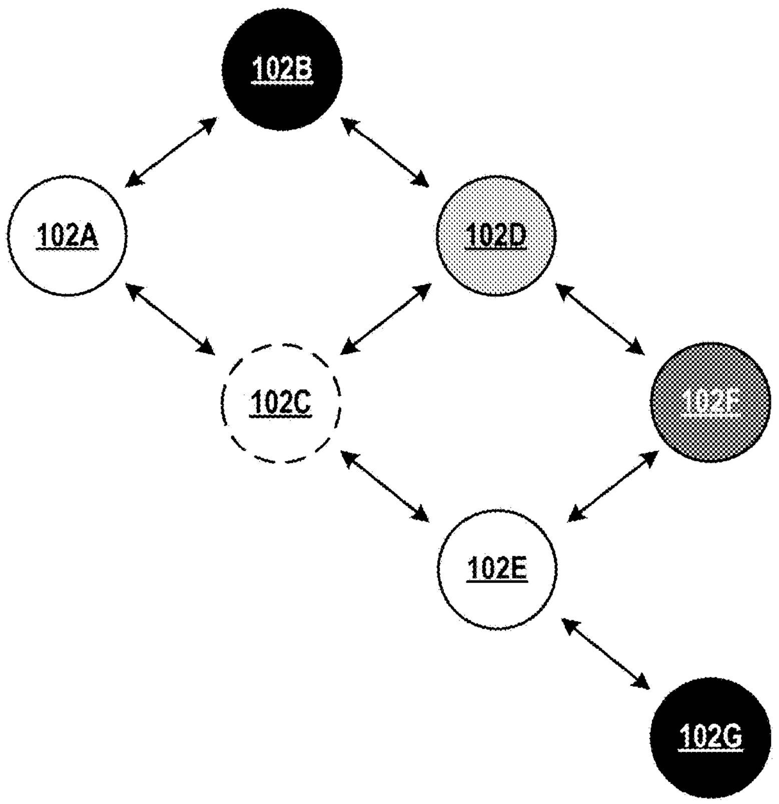
FIG. 6A and FIG. 6B are conceptual diagrams illustrating trust inferences for two different entities, in accordance with one or more aspects of the present disclosure.
Figure 6B:
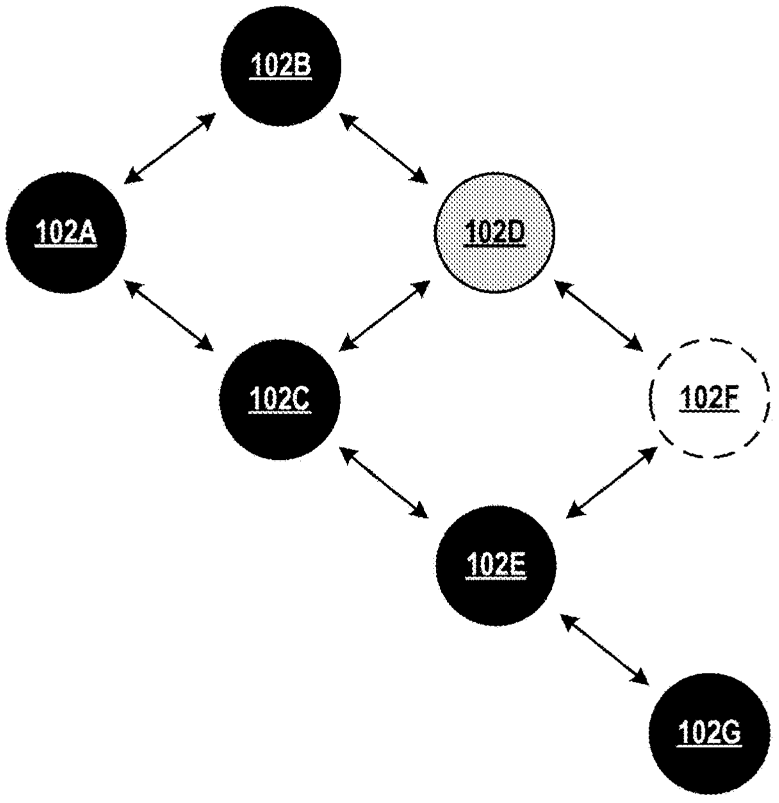

FIG. 6A and FIG. 6B are conceptual diagrams illustrating trust inferences for two different entities, in accordance with one or more aspects of the present disclosure. FIG. 6A illustrates a set of trust inferences from the perspective of network entity 102C (note that network entity 102C is shown with a dotted line in FIG. 6A). FIG. 6B illustrates a set of trust inferences from the perspective of network entity 102F (note that network entity 102F is shown with a dotted line in FIG. 6B).

In FIG. 6A, and as illustrated by the shading of network entities 102 in the diagram, network entity 102C trusts network entity 102A and network entity 102E, and has some lesser level of trust for network entity 102D and network entity 102F. Network entity 102C does not, however, trust network entity 102B or network entity 102G.

In FIG. 6B, and as illustrated by the shading of network entities 102 in diagram of FIG. 6B, network entity 102F has some level of trust for network entity 102D, but does not trust any of the other network entities 102. Taken together, FIG. 6A and FIG. 6B illustrate that network entity 102C does trust network entity 102F to some extent, but that network entity 102F does not trust network entity 102C. Accordingly, this example highlights that those degrees of trust between entities are, at least in some examples, not reciprocal. Degrees of trust, particularly when trust inferences are used, are often not reciprocal.

Figure 7:
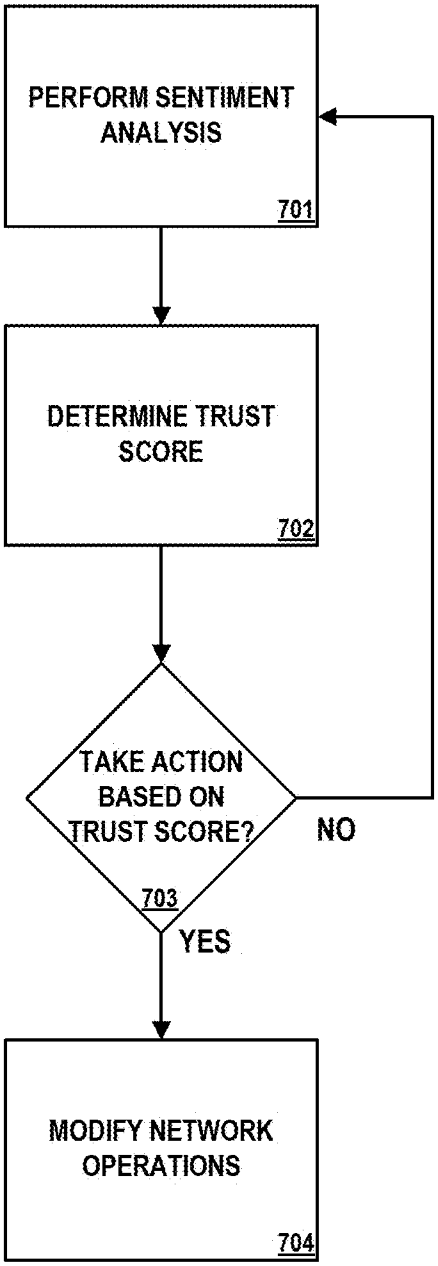
FIG. 7 is a flow diagram illustrating operations performed by an example trust controller in accordance with one or more aspects of the present disclosure.

FIG. 7 is a flow diagram illustrating operations performed by an example trust controller 104 in accordance with one or more aspects of the present disclosure. FIG. 7 is described below within the context of network 100 and trust controller 104 of FIG. 1A. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described.

In the process illustrated in FIG. 7, and in accordance with one or more aspects of the present disclosure, trust controller 104 may perform sentiment analysis associated with a network entity (701). For example, in some examples, trust controller 104 of FIG. 1A collects information from one or more of input systems 103 about one of network entities 102, such as network entity 102A. In such an example, the information pertains to network entity 102A and includes text derived from user input, trouble-ticketing systems, collaboration systems, or state changes associated with diagnostic operations performed within the network. Trust controller 104 processes the information in preparation for applying a machine learning model that has been trained to predict sentiment from such information. Trust controller 104 applies the machine learning model to the information to predict sentiment for network entity 102A. The predicted sentiment may be in the form of a sentiment polarity, a sentiment trend, a sentiment category, or a sentiment score.

Trust controller 104 may determine a trust score for the network entity (702). For example, again with reference to FIG. 1A, trust controller 104 calculates a trust score for network entity 102A based on several factors. The factors used in the calculation may include various prerequisite, variable factors, and reputation factors. In some examples, trust controller 104 uses the predicted sentiment for network entity 102A as a variable factor. In other examples, trust controller 104 calculates an initial trust score for network entity 102A, and then uses the predicted sentiment to adjust the initial trust score, thereby resulting in a final trust score for network entity 102A.

Trust controller 104 may determine whether action should be taken based on the trust score for network entity 102A (703). For example, in FIG. 1A, trust controller 104 evaluates the calculated trust score for network entity 102A and assesses to what extent network entity 102A can be trusted. In some examples, such an assessment may involve determining whether the trust score for network entity 102A is trending higher or lower and/or exceeds one or more thresholds. If the trust score for network entity 102A is sufficient high (indicating that that network entity 102A can be trusted), 104 might not take action (NO path from 103). However, if the trust score for 102*a* is relatively low (indicating low trust), trust controller 104 may take action (YES path from 703).

In such an example, trust controller 104 may modify network operations within the network (704). For example, in FIG. 1A, trust controller 104 may adjust configurations for a firewall, router, or other network device. Alternatively, or in addition, trust controller 104 may re-route traffic, limit access to network entity 102A, or adjust configurations associated with access control system 193 and/or asset management system 194.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., network entities 102, trust controller 104, entities 110, quantitative entities 160, qualitative entities 170, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in several different ways. For instance, one or more devices illustrated in the Figures herein (e.g., FIG. 1A and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a storage device storing instructions, wherein the instructions are executable by the processing circuitry to:

perform, based on information collected about a specific network entity from among a plurality of network entities in a computer network, a sentiment analysis involving user comments associated with the specific network entity, wherein to perform the sentiment analysis, the processing circuitry is configured to train a machine learning model to predict sentiment from information about network entities included within the plurality of network entities, and apply the machine learning model to predict the sentiment for the specific network entity from the information collected about the specific network entity;

determine sub-scores for each of a plurality of characteristics of the specific network entity, wherein to determine the sub-scores, the processing circuitry is further configured to determine a sub-score associated with the sentiment analysis;

determine, based on the sub-scores for each of the plurality of characteristics of the specific network entity, a level of trust for the specific network entity; and perform an action based on the level of trust for the specific network entity, wherein to perform the action, the processing circuitry is further configured to communicate with a device on the computer network to modify operations within the computer network.

2. The computing system of claim 1, wherein to determine the level of trust, the instructions are executable by the processing circuitry to:

assign, based on the determined level of trust, one of a finite number of trust categories to the specific network entity.

3. The computing system of claim 2, wherein the storage device further stores instructions executable by the processing circuitry to:

output a user interface expressing the level of trust using the assigned one of the finite number of trust categories; and enable, based on the level of trust, the specific network entity to perform an operation on the computer network.

4. The computing system of claim 1, wherein the storage device further stores instructions executable by the processing circuitry to:

determine an amount of trust that another network entity has for the specific network entity.

5. The computing system of claim 4, wherein to determine the level of trust, the instructions are executable by the processing circuitry to:

determine the level of trust further based on the amount of trust that the other network entity has for the specific network entity.

6. The computing system of claim 1, wherein the storage device further stores instructions executable by the processing circuitry to:

determine a prerequisite sub-score for the specific network entity based on one or more prerequisites for the specific network entity.

7. The computing system of claim 6, wherein to determine the level of trust, the instructions are executable by the processing circuitry to:

determine the level of trust further based on the prerequisite sub-score.

8. The computing system of claim 1, wherein to perform the sentiment analysis, the instructions are executable by the processing circuitry to:

process the information collected about the specific network entity in a pipeline that translates raw text into clean text suitable for natural language processing; and apply a machine learning model to the clean text to predict the sentiment associated with the specific network entity.

9. The computing system of claim 1, wherein the information collected about the specific network entity includes at least one of:

log information, diagnostic information, trouble-ticketing information, emails, chat messages, collaboration applications, metadata associated with the specific network entity, information derived from user interface interactions, or text received in response to user interface interactions.

10. The computing system of claim 1, wherein to modify operations, the instructions are executable by the processing circuitry to change configurations for at least one of:

a router, a firewall, an access control system, an asset management system, or an alarm system.

11. A method comprising:

performing, by a computing system and based on information collected about a specific network entity from among a plurality of network entities in a computer network, a sentiment analysis involving user comments associated with the specific network entity, wherein performing the sentiment analysis includes training a machine learning model to predict sentiment from information about network entities included within the plurality of network entities, and applying the machine learning model to predict the sentiment for the specific network entity from the information collected about the specific network entity;

determining, by the computing system, sub-scores for each of a plurality of characteristics of the specific network entity, wherein determining the sub-scores includes determining a sub-score associated with the sentiment analysis;

determining, by the computing system and based on the sub-scores for each of the plurality of characteristics of the specific network entity, a level of trust for the specific network entity; and performing an action, by the computing system and based on the level of trust for the specific network entity, wherein performing the action includes communicating with a device on the computer network to modify operations within the computer network.

12. The method of claim 11, wherein determining the level of trust includes:

assigning, based on the determined level of trust, one of a finite number of trust categories to the specific network entity.

13. The method of claim 12, further comprising:

outputting, by the computing system, a user interface expressing the level of trust using the assigned one of the finite number of trust categories; and enabling, by the computing system and based on the level of trust, the specific network entity to perform an operation on the computer network.

14. The method of claim 11, further comprising:

determining, by the computing system, an amount of trust that another network entity has for the specific network entity.

15. The method of claim 14, wherein determining the level of trust includes:

determining the level of trust further based on the amount of trust that the other network entity has for the specific network entity.

16. The method of claim 11, further comprising:

determining, by the computing system, a prerequisite sub-score for the specific network entity based on one or more prerequisites for the specific network entity.

17. The method of claim 16 wherein determining the level of trust includes:

determining the level of trust further based on the prerequisite sub-score.

18. Non-transitory computer-readable media comprising instructions executable by processing circuitry of a computing system to:

perform, based on information collected about a specific network entity from among a plurality of network entities in a computer network, a sentiment analysis involving user comments associated with the specific network entity, wherein to perform the sentiment analysis, the processing circuitry is configured to train a machine learning model to predict sentiment from information about network entities included within the plurality of network entities, and apply the machine learning model to predict the sentiment for the specific network entity from the information collected about the specific network entity;

determine sub-scores for each of a plurality of characteristics of the specific network entity, wherein to determine the sub-scores, the processing circuitry is further configured to determine a sub-score associated with the sentiment analysis;

determine, based on the sub-scores for each of the plurality of characteristics of the specific network entity, a level of trust for the specific network entity; and perform an action based on the level of trust for the specific network entity, wherein to perform the action, the processing circuitry is further configured to communicate with a device on the computer network to modify operations within the computer network.

* * * * *